US010739977B2

(12) United States Patent
Chiu

(10) Patent No.: US 10,739,977 B2
(45) Date of Patent: Aug. 11, 2020

(54) DEVICE, METHOD AND COMPUTER PROGRAM PRODUCT OF VERTICAL COMPREHENSIVE DETAILED INFORMATION

(71) Applicant: MITAKE INFORMATION CORPORATION, Taipei (TW)

(72) Inventor: Hung-Che Chiu, Taipei (TW)

(73) Assignee: MITAKE INFORMATION CORPORATION, Taipei (TW)

( * ) Notice: Subject to any disclaimer, the term of this patent is extended or adjusted under 35 U.S.C. 154(b) by 0 days.

(21) Appl. No.: 16/002,722

(22) Filed: Jun. 7, 2018

(65) Prior Publication Data

US 2018/0356968 A1 Dec. 13, 2018

(30) Foreign Application Priority Data

Jun. 8, 2017 (TW) .............................. 106119082 A

(51) Int. Cl.
*G06F 3/0484* (2013.01)
*G06F 3/0486* (2013.01)
*G06F 3/0482* (2013.01)
*G06Q 40/06* (2012.01)

(52) U.S. Cl.
CPC ........ *G06F 3/04847* (2013.01); *G06F 3/0482* (2013.01); *G06F 3/0484* (2013.01); *G06F 3/0486* (2013.01); *G06Q 40/06* (2013.01)

(58) Field of Classification Search
CPC .................................................. G06F 3/04847
See application file for complete search history.

(56) References Cited

U.S. PATENT DOCUMENTS

| 6,939,137 | B1 * | 9/2005 | Colaio | G06Q 20/10 434/107 |
|---|---|---|---|---|
| 2002/0049713 | A1 * | 4/2002 | Khemlani | G06Q 20/40 |
| 2008/0163085 | A1 * | 7/2008 | Subbu | G06F 9/451 715/763 |
| 2011/0074828 | A1 * | 3/2011 | Capela | G06F 3/0481 345/661 |
| 2013/0232148 | A1 * | 9/2013 | MacDonald | G06F 16/954 707/740 |
| 2014/0075411 | A1 * | 3/2014 | Diep | G06F 8/34 717/109 |
| 2015/0347603 | A1 * | 12/2015 | Jhunjhnuwala | G06F 16/9535 707/734 |
| 2015/0356160 | A1 * | 12/2015 | Berwick | G06F 3/04842 715/781 |
| 2016/0092084 | A1 * | 3/2016 | Dyar | G06F 3/0481 715/765 |
| 2017/0124531 | A1 * | 5/2017 | McCormack | G06Q 10/06 |

* cited by examiner

*Primary Examiner* — Amy Ng
*Assistant Examiner* — Samuel Shen
(74) *Attorney, Agent, or Firm* — Muncy, Geissler, Olds & Lowe, P.C.

(57) ABSTRACT

This disclosure is related to a device, method and computer program product of a vertical comprehensive detailed information. The device includes a communication module, a data transferring module, a watchlist module, a comprehensive detailed information module, one or more processors, a screen, and a memory. The comprehensive detailed information module produces a vertical comprehensive detailed information view, which accepts horizontal sliding instructions to switch among the stocks on a watchlist module.

7 Claims, 17 Drawing Sheets

DEVICE, METHOD AND COMPUTER PROGRAM PRODUCT OF VERTICAL COMPREHENSIVE DETAILED INFORMATION

BACKGROUND

Technical Field

The disclosure relates to a technique for the quotation of financial instruments for a mobile device, and more particularly to a device, method of a vertical comprehensive detailed information, and a computer program product thereof.

Related Art

Nowadays the stock quoting software running on mobile devices (such as smartphones and tablets) provide a watchlist (a.k.a. portfolio) function in order to make it easy for users to quickly see all the stocks, market indices, or other financial instruments that they are interested in watching, such as: funds, options, futures, warrants, etc. The watchlist function utilizes a watchlist view to present the basic quotes of financial instruments in the list of portfolio, such as: bid price, ask price, current price (a.k.a. last trade price), highest price, lowest price, single volume, total volume, opening price, previous closing price, etc. If one clicks on any of the financial instruments in the watchlist view, one can view the detailed information (a.k.a. "detailed quotation information") of the financial instrument, such as: real-time trend chart, technical analysis, instant times-and-sales (a.k.a. TAS), all times-and-sales, individual detailed quotation, price-and-volume statistics, level-II quotation, stocks news and so on.

The stock quoting software for such a mobile device is mostly developed by financial information vendors and is offered to a number of different securities firms (hereinafter referred to as brokers) for their customers to use. However, the software developed by the same financial information vendors has the same graphical user interface (GUI) for each of the different brokers, which makes the broker getting bored. The main reason is that all the brokers using the same graphical user interface which has no difference, just like "wearing uniforms".

Provisional patent publication No. 201126438 of the Republic of China, titled as "Device and method for sub-function views integration of the financial software on a touch-screen mobile device" discloses a related device and method for sub-function views integration of the financial software for a touch-screen mobile device. The device includes a plurality of functional modules that are used to generate sub-function information views based on financial instrument information, and a related sub-function view integration module to link multiple views of multiple related sub-functions information views. The technical problem that has been actually solved by this prior art (1) is that "the switching operation flow of the sub-function view of watchlist view of stock quoting software for the prior art mobile device is complicated" (see section [0029] of the specification). The technical effect of this prior art (1) is: "the addition of a comprehensive information long view in the financial instruments (stocks), and the comprehensive information long view is a vertical or horizontal integration of the original scattered and need to operate the menu to switch the various function view to become a single long view. Users can directly through the input-device-and-operation module to touch the long view of the scroll, in order to view the information of the various functions, without having to switch secondary function view through the menu operation".

Provisional patent publication No. 201145089 of the Republic of China, titled as discloses a device and a method for a detailed information combination of the stock quoting software. The device comprises a data receiving module, a plurality of detailed information modules, a detailed information integration module, an input-and-operating module. A data receiving module is used for receiving the financial instrument quotation information transmitted by the server to the touch mobile device. The plurality of detailed information modules are used for generating a plurality of detailed information views according to the financial instrument quotation information. The detailed information integration module is used for linking the detailed information views to generate a detailed information combination and generate a detailed information combination view based on the detailed information combination. The detailed information combination view contains two information blocks, corresponding to the detailed information combination. The input-and-operating module is used for receiving a touch sliding instruction, according to the touch sliding instruction to move the detailed information combination of the information block up, down, left or right to display the detailed information view. The technical problem that has been actually solved by this prior art (2) is that in the financial technology of the prior art touch-sensitive mobile device, the switching process between the detailed information view of the quotation view is quite inconvenient and does not effectively use the touch operations (see paragraph [0021] of the specification). The technical effect of this prior art (2) is the addition of a detailed information combination view, which is divided into two blocks of information. The straight view is divided into up and down information blocks, and the horizontal view is divided into left and right information blocks. A detailed information combination is provided in each of the two blocks. The detailed information combination contains a combination of detailed information views or a combination of any detailed information views. User can easily switch detailed information combinations by using a touch-and-slide operation without having to view each detailed information view with menus and buttons operations.

The related sub-function view integration module 64 of the prior art (1) described above and the detailed information integration module 60 of the prior art (2) are all responsible for processing the detailed information (i.e., the "secondary function" referred to in the prior art). Although the prior art (1) is described in the paragraph [0051], the "user-custom-info-combination module 66 allows the user to configure which sub views generated by the secondary function module 56 to include in the integrated information long view 62". The prior art (2) is also described in the paragraph [0046] that the "user-custom-info-combination module 66 allows the user to configure a detailed information view generated by the detailed information module 56 to include in the detailed information combination 64". However, neither has revealed whether the order of the detailed information can be configured and how they should be configured. Of course, the two prior arts are not exposed to a more progressive way for the broker to send parameters from the server side to configure the detailed information, to avoid the inconvenience for the users which are elderly and not good at the configuration on their own. Another problem is that when a number of different brokers using the stock quoting software developed by the same financial information vendor, the prior arts can not provide different detailed information views for each broker, resulting in brokers have the "wearing uniforms" issue. To change the order of the detailed information view of the stock quoting software in the prior arts must update the software version first. But the software store platform (such as Google Play and Apple App Store) has a software review mechanism, each review process of the software may take from a few days to a couple of weeks. It is quite inconvenient and wasting time in reviewing process for financial information vendors when only the order of the details view is changed.

In addition, the prior arts focus only on the appearance and operation of the detailed information of a single financial instrument, not switching among the detailed information of multiple financial instruments (such as multiple portfolio stocks). In the prior art (1), when the user has viewed the integrated information long view 62 (i.e., step 205 of FIG. 6) of a financial instrument, if user wants to switch to another integrated information long view of the financial instrument, it is desired to switch back to the watchlist view and then click the integrated information long view 62 of another financial instrument, (See step 204 of FIG. 6). In the prior art (2), when the user has viewed the detailed information combination view 62 of a financial instrument, if user wants to switch to another detailed information combination view 62 of the financial instrument, it is desired to switch to the watchlist view (step 202 of FIG. 11) and then click on the financial instrument (step 203 of FIG. 11). Both prior arts are in the same position (entry point) of the integrated information long view 62/detailed information combination view 62 after switching to different financial instruments. In the case of FIG. 4A of the prior art (1), when the user is looking at the "instant times-and-sales" of "TSMC", if the user wishes to switch to another financial instrument "UMC" and view its "instant times-and-sales", the user must follow step 202 to step 204 of FIG. 6. The entry point of step 205 (referring to the detailed information displayed on the screen) is "real-time trend chart", and the user must slide further again to toggle the "instant times-and-sales". In other words, the prior arts do not provide a technology that can quickly switch the comprehensive detailed information among the financial instruments, nor provide a positioning technology that recalls the last operating position when switching the comprehensive detailed information among the different financial instruments.

That is, the prior art does not meet the needs of the user. It is necessary to improve the resources of the previous technical hardware and software to cooperate to provide a straightforward comprehensive detailed information technology, and to provide a technology that allows the broker to send parameters to change the comprehensive detailed information configurations so that detailed information has a customized difference without updating the software version and allows users to quickly switch among different financial instruments; meanwhile, the technology allows users to switch among different financial instruments and can remember the last operating position of the comprehensive detailed information in order to compensate for the prior arts' deficiencies.

BRIEF SUMMARY OF THE INVENTION

In view of the above, the disclosure provides a device, method of vertical comprehensive detailed information, and a computer program product thereof. When the comprehensive information is displayed, the sliding operation can be directly switched to a different financial instrument, and the position of the comprehensive details would be the same when switching.

The disclosure provides a device of vertical comprehensive detailed information, comprising: a communication module, establishing a connection of network; a data transferring module, establishing a connection with a quotation server to transmit data; a memory, storing a watchlist, wherein the watchlist contains a plurality of financial instruments; a screen, showing a watchlist view and a comprehensive detailed information view; one or more processors, connecting to the memory and the screen; a watchlist module, driving the data transferring module to download a corresponding quotation information from the quotation server based on the watchlist and generates the watchlist view based on the quotation information; an comprehensive detailed information module, generating the comprehensive detailed information view based on the quotation information, wherein the comprehensive detailed information view integrates a plurality of detailed information in a vertical direction, receiving a vertical sliding instruction acting on the comprehensive detail information view to switch and display the detailed information on the screen, storing a displaying position of the comprehensive detailed information view in the memory after executing the vertical sliding instruction, receiving a horizontal sliding instruction acting on the comprehensive detailed information view to switch among the financial instruments, and displaying the comprehensive information detailed view of the next financial instrument on the screen according to the previous displaying position of the previous financial instrument.

In an embodiment of the disclosure, one of the detailed information is an real-time trend chart, the comprehensive detailed information module further receives a Y-axis scale switching instruction of the real-time trend chart to change a displaying scale of a vertical axis, receives a Y-axis zooming instruction of the real-time trend chart to double magnify or restore an original height of the real-time trend chart, and receives a price-check instruction of the real-time trend chart to produce a price-check tool.

In an embodiment of the disclosure, the comprehensive detailed information module configures the height of the real-time trend chart to a standard height or a double magnification height based on a downloaded height parameter.

In an embodiment of the disclosure, the detailed information are divided into two categories: a fixed-height detailed information and an unfixed-height detailed information, and the unfixed-height detailed information are arranged below the fixed-height detailed information.

In an embodiment of the disclosure, further comprising: a system setting module, generating a detailed information setting view and receiving a drag-and-drop instruction applied to the detailed information setting view to change the order of the information.

In an embodiment of the disclosure, the comprehensive detailed information module generates the comprehensive detailed information view based on one of the parameters and the quotation information, wherein the parameters are used to configure the order of the detailed information.

The disclosure provides a method of a vertical comprehensive detailed information, applicable to a mobile device, the mobile device comprising a communication module, a memory and a screen, wherein the memory stores a watchlist and the watchlist contains a plurality of financial instruments, the method comprising the steps of: establishing a network connection with a quotation server through the communication module; downloading a quotation information of the corresponding financial instruments according to watchlist from the quotation server; generating a watchlist view based on the quotation information; receiving a selection instruction from the watchlist view; generating a comprehensive detailed information view based on the quotation information corresponding to the selection instruction, wherein the comprehensive detailed information view integrates a plurality of detailed information in a vertical direction; receiving a vertical sliding instruction acting on the comprehensive detail information view to switch and display the detailed information on the screen; storing a displaying position of the comprehensive detailed information view in the memory after executing the vertical sliding instruction; receiving a horizontal sliding instruction acting on the comprehensive detailed information view to switch among the financial instruments on the watchlist; and displaying the comprehensive information detailed view of another financial instrument on the screen according to the displaying position stored in the memory.

In an embodiment of the disclosure, one of the detailed information is a real-time trend chart, the method further comprises the steps of: receiving a Y-axis scale switching instruction of the real-time trend chart to change a displaying scale of a vertical axis, receiving a Y-axis zooming instruction of the real-time trend chart to double magnify or restore an original height of the real-time trend chart, and receiving a price-check instruction of the real-time trend chart to produce a price-check tool on the real-time trend chart.

In an embodiment of the disclosure, the method further comprises the step of configuring the height of the real-time trend chart to a standard height or a double magnification height based on a "height parameter" downloaded from the quotation server.

In an embodiment of the disclosure, the detailed information are divided into two categories: a fixed-height detailed information and an unfixed-height detailed information, and the unfixed-height detailed information are arranged below the fixed-height detailed information.

In an embodiment of the disclosure, the method further comprises the step of generating a detailed information setting view and receiving a drag-and-drop instruction applied to the detailed information setting view to change the order of the information.

In an embodiment of the disclosure, the method further comprises the step of receiving a parameter from the quotation server and generating the comprehensive detailed information view based on the parameter and the quotation information corresponding to the selection instruction, wherein the parameter is used to configure the order of the detailed information.

The disclosure provides a computer program product installed on a mobile device having a communication module, a screen and at least one processor, the computer program product comprising: a first program instruction, executed by the processor, establishing a connection with a quotation server to transmit data; a second program instruction, executed by the processor, downloading a corresponding quotation information from the quotation server based on a watchlist and generating a watchlist view based on the quotation information; a third program instruction, executed by the processor, generating a comprehensive detailed information view based on the quotation information, wherein the comprehensive detailed information view integrates a plurality of detailed information in a vertical direction, receiving a vertical sliding instruction acting on the comprehensive detail information view to switch and display the detailed information on the screen, storing a displaying position of the comprehensive detailed information view in the memory after executing the vertical sliding instruction, receiving a horizontal sliding instruction acting on the comprehensive detailed information view to switch among the financial instruments, and displaying the comprehensive information detailed view of the next financial instrument on the screen according to the previous displaying position of the previous financial instrument.

In an embodiment of the disclosure, one of the detailed information is a real-time trend chart, the third program instruction, further receives a Y-axis scale switching instruction of the real-time trend chart to change a displaying scale of a vertical axis, receives a Y-axis zooming instruction of the real-time trend chart to double magnify or restore an original height of the real-time trend chart, and receives a price-check instruction of the real-time trend chart to produce a price-check tool.

In an embodiment of the disclosure, the third program instruction further comprises: configuring the height of the real-time trend chart to a standard height or a double magnification height based on a downloaded height parameter.

In an embodiment of the disclosure, the detailed information are divided into two categories: a fixed-height detailed information and an unfixed-height detailed information, and the unfixed-height detailed information are arranged below the fixed-height detailed information.

In an embodiment of the disclosure, further comprising: a forth program instruction, receiving a drag-and-drop instruction applied to the detailed information setting view to change the order of the information.

In an embodiment of the disclosure, wherein the third program instruction further comprises: executed by the processor, generating the comprehensive detailed information view based on one of the parameters and the quotation information, wherein the parameters are used to configure the order of the detailed information.

The following detailed description of the detailed features and advantages of the invention is set forth in connection with the following description. It will be readily understood by those skilled in the art that the relevant objects and advantages of the disclosure may be readily understood.

BRIEF DESCRIPTION OF THE DRAWINGS

All the objects, advantages, and novel features of the invention will become more apparent from the following detailed descriptions when taken in conjunction with the accompanying drawings.

DETAILED DESCRIPTION OF THE INVENTION

The disclosure utilizes, but is not limited to, a smartphone and a tablet computer, and the apparatus and method of the disclosure may be applied to any mobile device configured with a screen and capable of executing the application program of the disclosure (i.e., stock quoting software).

Figure 1:
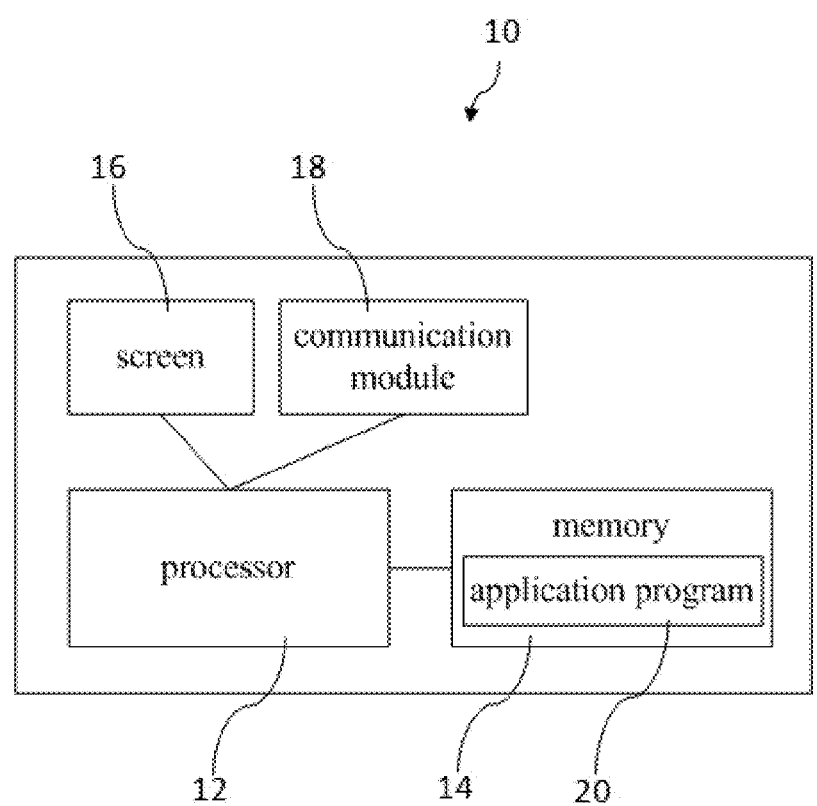
FIG. 1 is a system functional block diagram of a device according to an embodiment of the disclosure.
Figure 2:
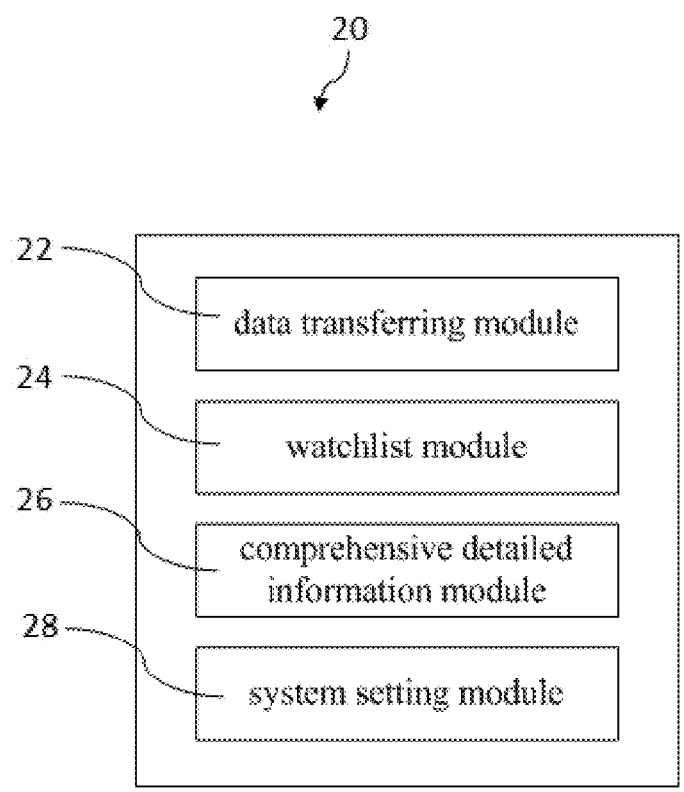
FIG. 2 is a functional block diagram of an application program according to an embodiment of the disclosure.

Referring to FIGS. 1 and 2, they show the system functional block diagram of the device 10 of the vertical comprehensive detailed information and the application program 20 according to an embodiment of the disclosure. The figures only list the core modules associated with a preferred embodiment of the disclosure, and the remaining irrelevant modules are omitted. The application program 20 is executed on the device 10 (i.e., a mobile device) of the disclosure. In an embodiment of the disclosure, the device 10 of the disclosure comprises: one or more processors 12, a memory 14, a screen 16, and a communication module 18. In the embodiment of the disclosure, the memory 14 stores the application program 20; the processor 12 executes the plurality of program instructions contained in the application program 20 and implements the following modules in a manner of hardware-software cooperative approach: the data transferring module 22, the watchlist module 24, a comprehensive detailed information module 26 and a system setting module 28; the screen 16 is used for displaying a graphical user interface (GUI) of the application program 20; the communication module 18 is used for establishing an internet connection, through such as wire broadband, wireless local area network (WLAN), Wi-Fi, and the mobile communication networks (such as 3G, 4G . . . ) and so on.

Referring again to FIG. 2, the system function block diagram of application program 20 according to an embodiment of the disclosure. The data transferring module 22 establishes a network connection with the remote quotation server via the communication module 18 to transmit data. The so-called "data" contains various information contents, instructions and configurations uploaded to the quotation server by the device 10 of the comprehensive detailed information, such as the subscription instruction (to request the quotations of the watchlist instruments), the watchlist (to record the financial instruments) and so on, as well as the quotation information and configurations of the device 10 of the comprehensive detailed information downloaded from the quotation server, such as the quotation information, the watchlist and so on.

The watchlist module 24 drives the data transferring module 22 to download the corresponding quotation information from the quotation server based on the watchlist and generates the watchlist view 30 according to the quotation information. The so-called watchlist is a list of financial instruments that is edited by the user himself and the watchlist contains a plurality of financial instruments. The user can edit the financial instruments in the watchlist (e.g., adding, deleting and modifying the instruments on the list). In some embodiments, the watchlist is stored on the device 10 of the comprehensive detailed information, and the watchlist module 24 generates and uploads the subscription instruction to the quotation server via the data transferring module 22 according to the watchlist. After the quotation server receives the subscription instruction, the quotation information corresponding to all the financial instruments is retrieved from the database and then transmitted to the device 10 of the comprehensive detailed information via the data transferring module 22. In some embodiments, the watchlist is stored on the quotation server, which quotes the quotation information for all financial instruments from the repository based on the watchlist and is then forwarded via the data transferring module 22 to the device 10 of the comprehensive detailed information. The watchlist module 24 then generates the watchlist view 30 based on the quotation information for all financial instruments, meaning that the watchlist view 30 contains quotation information for a plurality of financial instruments.

The comprehensive detailed information module 26 generates a comprehensive detailed information view 32, based on the parameters sent by the quotation server and the quotation information, for a single financial instrument. The comprehensive detailed information view 32 generated by the comprehensive information module 26 is integrated in the vertical direction, for example, real-time trend chart, technical analysis, instant times-and-sales, all times-and-sales, individual detailed quotation, price-and-volume statistics, level-II quotation and so on. The parameters are used to configure the order of the detailed information (see the next paragraph). The comprehensive detailed information module 26 receives the vertical sliding instructions applied by the user to the comprehensive detailed information view 32 to switch the display of the detailed information on the screen 16. In addition, the comprehensive detailed information module 26 stores the "still displaying position" in the memory 14 after the vertical sliding instruction is executed. That is, when the user scrolls up or down the comprehensive detailed information view 32, the displaying position (a.k.a. operating position) of the comprehensive detailed information view 32 on the screen 16 is recorded in the memory 14.

And the comprehensive detailed information module 26 receives the horizontal sliding instruction applied by the user to the comprehensive detailed information view 32 so as to switch among the financial instruments of the watchlist. The comprehensive detailed information module 26 is based on the displaying position (that is, the previous operating position) stored in the memory 14 to display the comprehensive detailed information view 32 of another financial instrument on the screen 16. That is, the comprehensive detailed information view 32 displayed on the screen 16 will be in the same displaying position after the previous vertical sliding instruction is executed, regardless of which of the financial instrument the user has switched with the horizontal sliding instruction (i.e., the same details are displayed). For example, the user looks at the comprehensive detailed information view 32 of the first financial instrument, the screen 16 displays the "level-II quotation" (i.e., a displaying position) after executed a vertical sliding instruction. When the user slides to the second financial instrument, the third financial instrument, or the Nth financial instrument, the screen 16 can immediately display the detailed information of "level-II quotation".

The disclosure can send parameters to the application program 20 by the quotation server, and the comprehensive detailed information module 26 adjusts the order of the detailed information according to the parameters. In the following table 1, the comprehensive detailed information module 26 of an embodiment of the disclosure arranges the order of detailed information by using the parameters, and the fragment code of the example is written in Java program language.

TABLE 1

```
//**default order
        private final String [ ] defaultFunction =
{"RTTChart","TimesNSales","LevelII","IndividualDetailedQuote","Pric
eNVolume"};
        public void onCreate(Bundle savedInstanceState) {
if(sharedPreferences.getString(SharePreferenceKey.NEW_STOCK_DET
AIL_ORDER,"").isEmpty( )){
                //**loading the order of the parameter
                String fnc =
configProperties.getProperty("NEWSTOCK_FNC_ORDER","");
                if(!fnc.isEmpty( )){
                    defaultFunction = fnc.split(",");
                }
                Collections.addAll(functionList, defaultFunction);
        }else{
//**loading the order of user defined
                Collections.addAll(functionList,
sharedPreferences.getString(SharePreferenceKey.NEW_STOCK_DETA
IL_ORDER,"").split(","));
        }
    }
```

Table 1 is a string of representatives of the various details, "RTTChart" represents "real-time trend chart", "TimesNSales" represents "instant times-and-sales", "LevelII" represents "level-II quotation", "IndividualDetailedQuote" represents "individual detailed quotation" and "PriceNVolume" represents "price-and-volume statistics", and the order of the detailed information is shown in the table "{"RTTChart", "TimesNSales", "LevelII", "IndividualDetailedQuote", "PriceNVolume" }".

In various embodiments, the disclosure may represent other detailed information in terms of other shorter codes. The rules in Table 1 are: comprehensive detailed information module 26 confirms whether there is a user-defined order "NEW_STOCK_DETAIL_ORDER". If there is a value, displays "NEW_STOCK_DETAIL_ORDER", if there is no value, checks the parameter "NEWSTOCK_FNC_ORDER". If "NEWSTOCK_FNC_ORDER" has no value, the default value "defaultFunction" is used. If "NEWSTOCK_FNC_ORDER" has a value, the value "NEWSTOCK_FNC_ORDER" is displayed.

The system setting module 28 provides a graphical user interface (GUI) for allowing the user to control a plurality of function configurations of the application program 20. One of them is the Drag and Drop to configure the order of the detailed information, and the order of the configuration is stored in the memory 14 and stored as the default value, that is, the "Collections.add. All (functionList, defaultFunction);" in Table 1. In the previous section, the comprehensive detailed information module 26 shall confirm whether there is a user-defined order "NEW_STOCK_DETAIL_ORDER", and if there is a value, displays "NEW_STOCK_DETAIL_ORDER". That is, if the user has configured the order in which the details are set, the order in which the parameters sent by the server are overwritten by the user-defined order. The remaining functional configurations are not directly related to the disclosure and are not described in detail.

In various embodiments of the disclosure, the above modules should be understood as a resource in cooperation with the hardware and the software, and the technical features of each module may be expressed by a plurality of program instructions or portions of the application program. However, the technical effect of each module must be implemented in the form of one or more processors to execute the program instructions or the form of the application program (i.e., the hardware and software co-operation), and the problem to be solved by the disclosure is improved through such hardware and software co-operation of the resources.

In another embodiment, the disclosure also provides a computer program product which is installed on a mobile device having a screen and a memory (i.e., device 10 of the comprehensive detailed information of FIG. 1). The computer program product includes the respective modules of the application program 20 of the FIG. 2: the data transferring module 22, the watchlist module 24, the comprehensive detailed information module 26, and the system setting module 28. The computer program product causes the communication module 18 to establish a connection with the quotation server to transmit the data, and to drive data transferring module 22 to download the corresponding quotation information from the quotation server based on the watchlist, and then generates the watchlist view 30 according to the quotation information. This computer program product generates the comprehensive detailed information view 32 based on the parameters and the quotation information sent from the quotation server. The comprehensive detailed information view 32 is integrated in the vertical direction, and the parameters are used to configure the order of the detailed information. This computer program product receives the user's vertical sliding instruction acting in the comprehensive detailed information view 32 to switch and display the detailed information on the screen 16, and stores the still displaying position of the comprehensive detailed information view 32 in the memory 14 after executing vertical sliding instruction. The computer program product receives the user's horizontal sliding instruction in the comprehensive detailed information view 32 to switch among the financial instruments and display the comprehensive information detailed view 32 of the next financial instrument on the screen 16 according to the previous displaying position of the previous financial instrument.

This computer program product receives the drag-and-drop instruction from the user's details setting view to configure the order in which the detailed information is configured.

Figure 3:
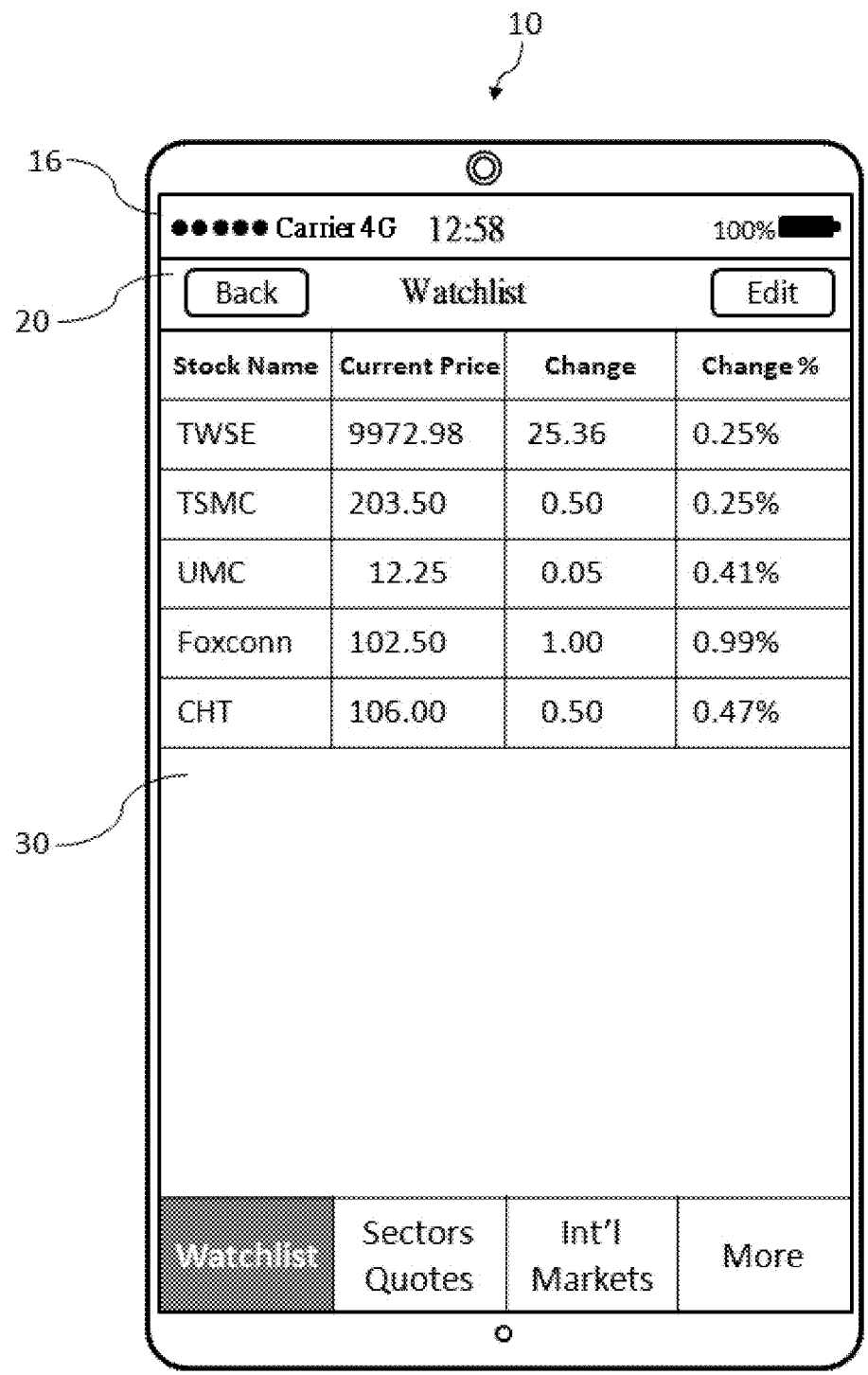
FIG. 3 is a schematic diagram of a watchlist view displayed on the screen according to an embodiment of the disclosure.

Referring to FIG. 3, it is a schematic diagram of the watchlist view 30 displayed on screen 16 according to an embodiment of the disclosure. It illustrates a preferred embodiment of the disclosure, showing a graphical user interface of the application program 20 displayed on the screen 16 of the device 10 of the comprehensive detailed information. The disclosure is not limited to the use of a smartphone, and the disclosure can be applied to a tablet computer or other mobile devices. The illustration of the watchlist view 30 has five financial instruments and it shows the quotation information columns for the "stock's name", "current price", "change" and "change %". In some embodiments, the watchlist view 30 also provides multiple quotes columns (not shown), such as "opening price", "highest price", "lowest price", "previous closing price", "single volume", "total volume" and so on. The users slide left and right to switch other quotation information column.

Figure 4:
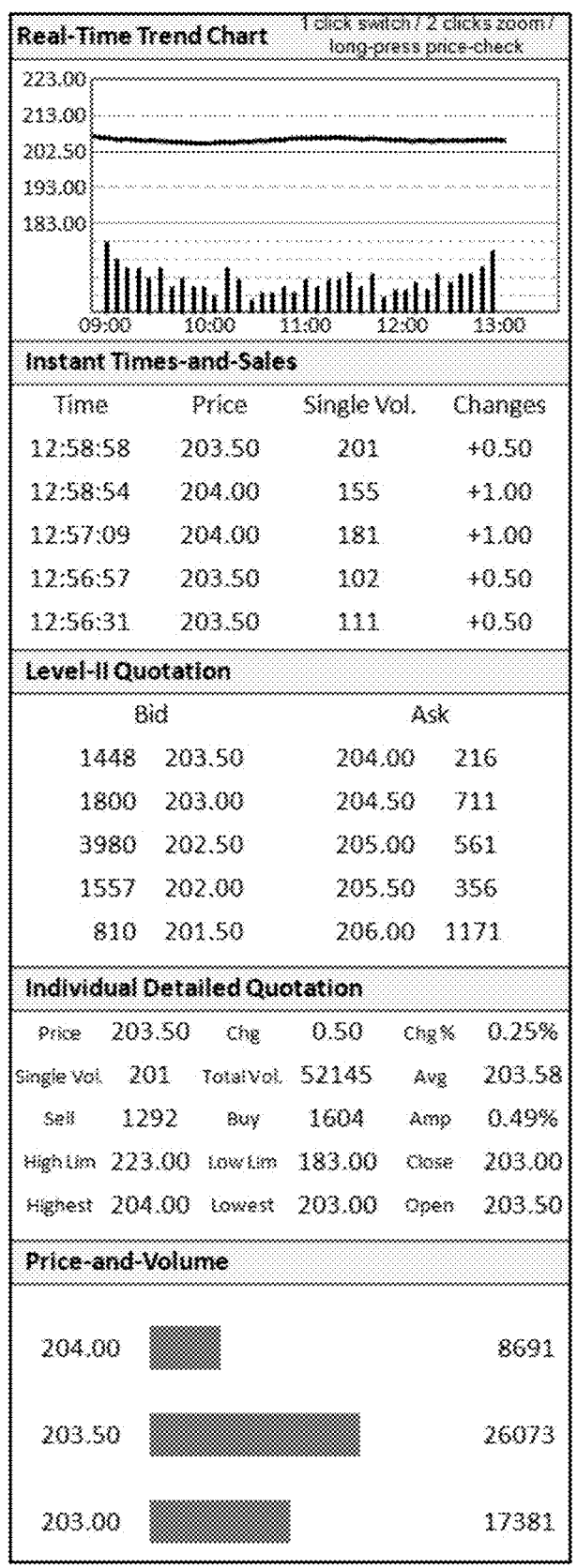
FIG. 4 is a schematic diagram of a comprehensive detailed information view according to an embodiment of the disclosure.

Referring to FIG. 4, it shows a comprehensive detailed information view 32 according to an embodiment of the disclosure. It illustrates that the comprehensive detailed information view 32 of the disclosure integrates all the detailed information in a vertical direction. The disclosure divides the detailed information into two categories: a fixed-height detailed information and an unfixed-height detailed information. Due to the fixed amount of information, the fixed-height detailed information displayed on the screen 16 occupies a fixed height (screen pixel).

The height of the unfixed-height detailed information displayed on the screen 16 is dependent on the amount of information contained, and therefore, the height is not fixed when the screen 16 displays. The comprehensive detailed information view 32 of the disclosure is intended to prioritize to arrange the fixed-height detailed information above the unfixed-height detailed information, which is intended to facilitate the calculation of the displaying position of the comprehensive detailed information view 32 of another financial instrument when switching among different financial instruments 32 (detailed description will be followed). In the illustration, the fixed-height detailed information displayed include: "real-time trend chart", "instant times-and-sales", "level-II quotation" and "individual detailed quotation", while the unfixed-height detailed information includes "price-and-volume statistics".

Figure 5:
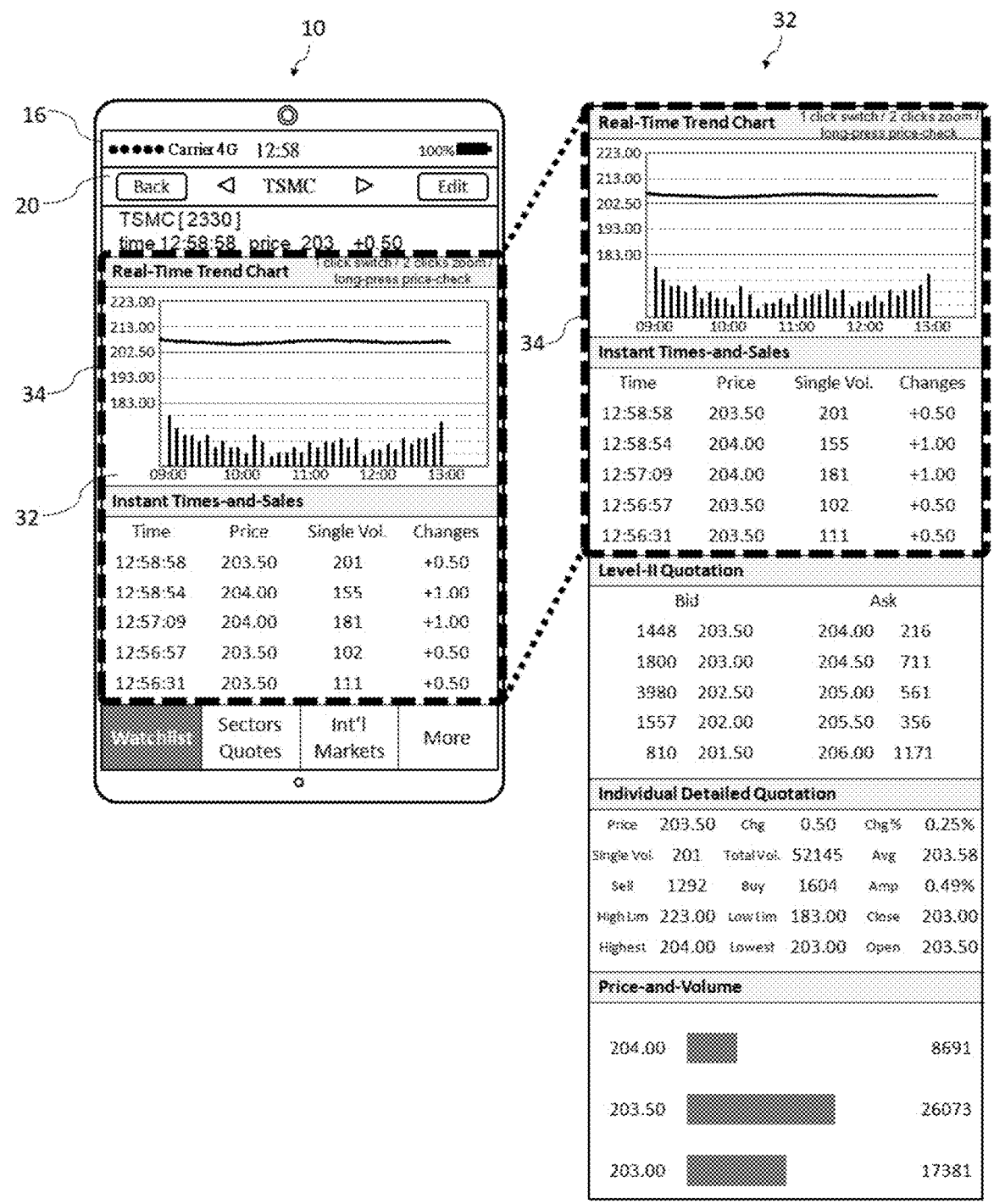
FIG. 5 is a schematic diagram (1) of a comprehensive detailed information view and the screen according to an embodiment of the disclosure.
Figure 6:
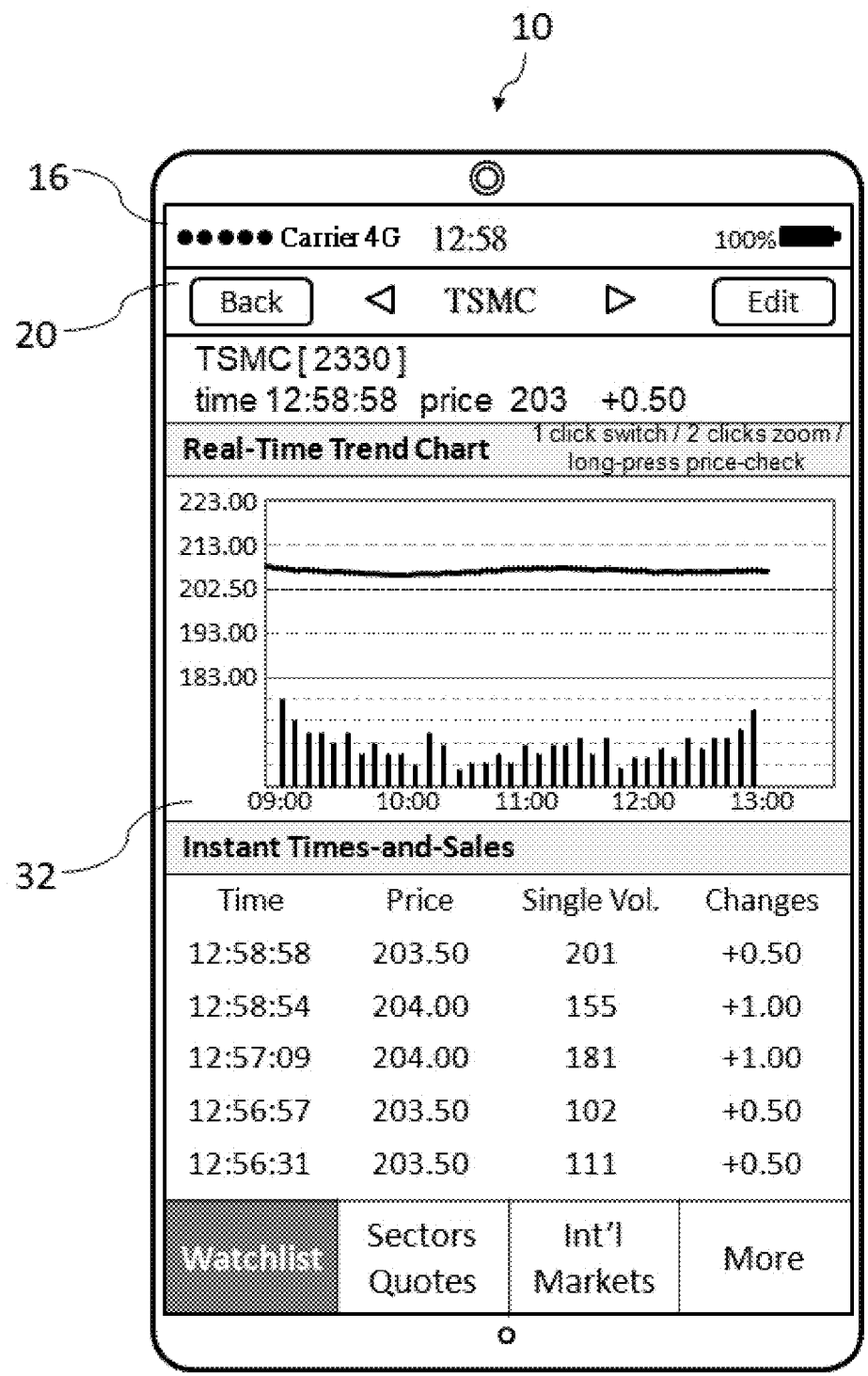
FIG. 6 is a schematic diagram (1) of a comprehensive detailed information view displayed on the screen according to an embodiment of the disclosure.

Please also refer to FIG. 5 and FIG. 6. FIG. 5 is a schematic diagram (1) of a comprehensive detailed information view 32 and the screen 16 according to an embodiment of the disclosure. For convenience of illustration, the displaying position 34 is shown in dotted lines of a rectangle in the figure, however, in the actual operation, the dotted lines of a rectangle is not shown on the screen 16. FIG. 5 illustrates because the Visible Display Area of the screen 16 is limited and the comprehensive detailed information view 32 can not be fully presented at one time, the user uses the vertical sliding instruction (i.e., sliding up/down on the comprehensive detailed information view 32) to switch to show different detailed information. FIG. 6 corresponds to FIG. 5, is a schematic diagram (1) of a comprehensive detailed information view 32 displayed on the screen 16 according to an embodiment of the disclosure, and the detailed information of the illustration are "real-time trend chart" and "instant times-and-sales".

Figure 7:
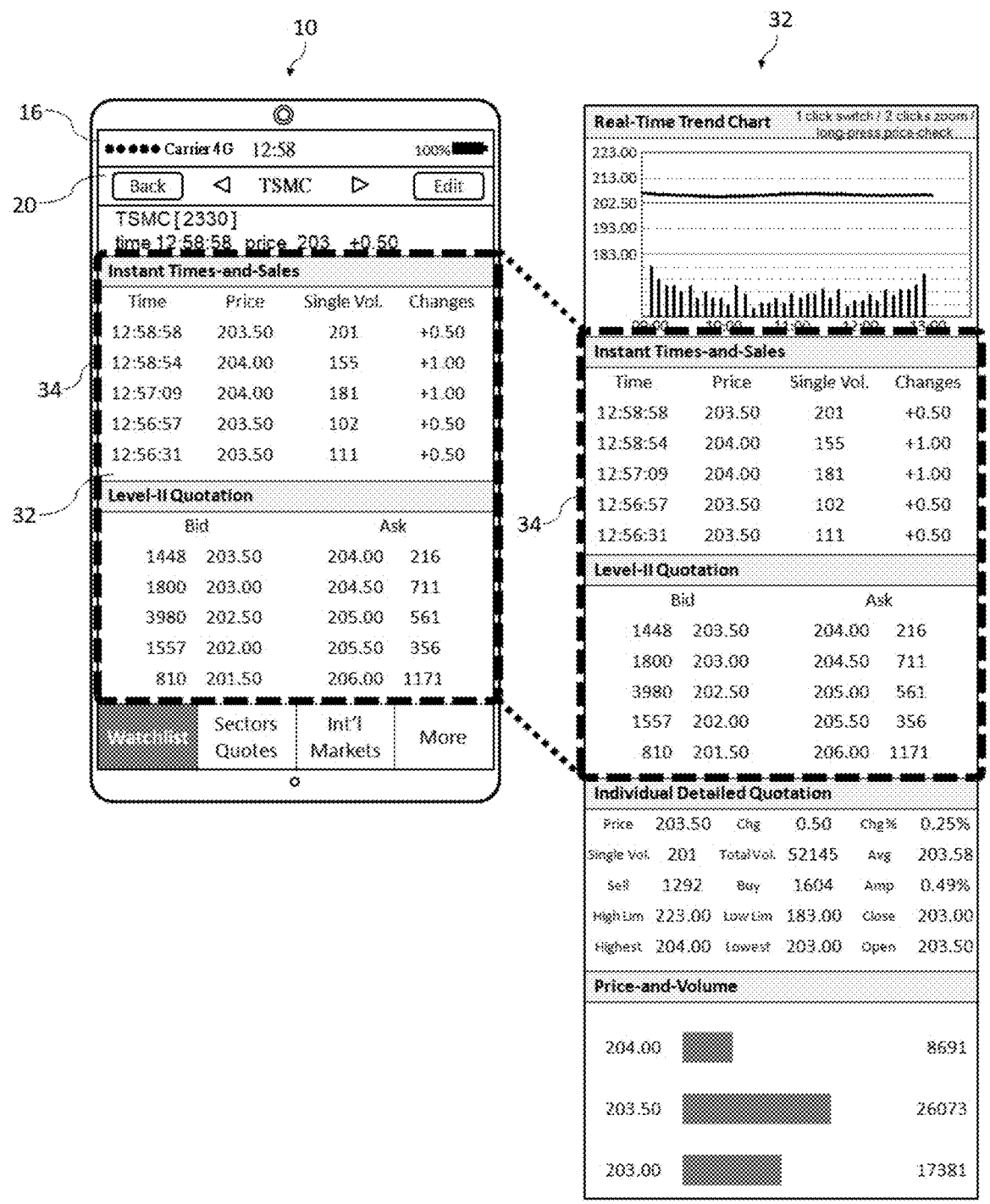
FIG. 7 is a schematic diagram (2) of a comprehensive detailed information view and the screen according to an embodiment of the disclosure.
Figure 8:
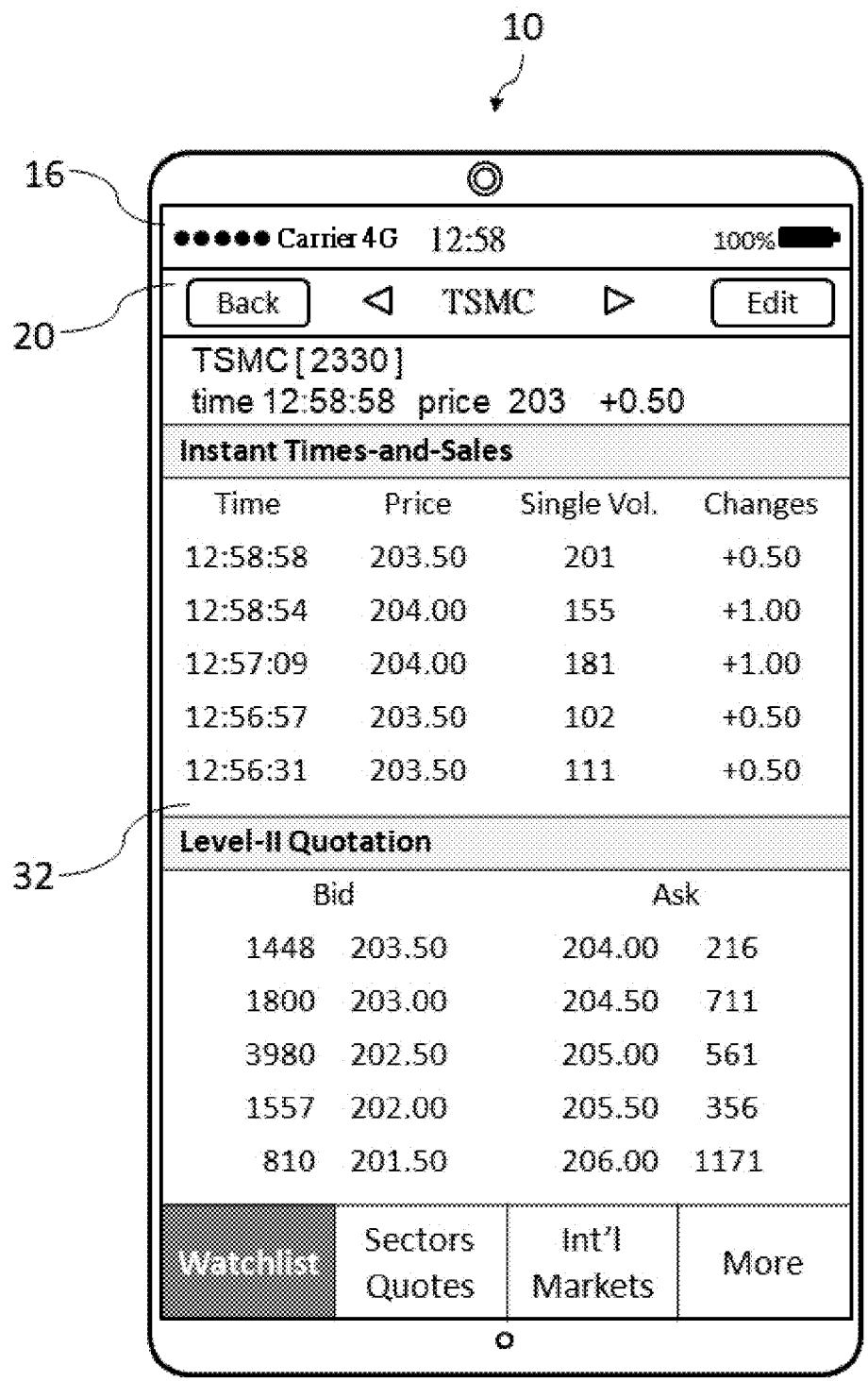
FIG. 8 is a schematic diagram (2) of a comprehensive detailed information view displayed on the screen according to an embodiment of the disclosure.

Please also refer to FIG. 7 and FIG. 8. FIG. 7 is a schematic diagram (2) of the comprehensive detailed information view 32 and the screen 16 according to an embodiment of the disclosure. When the user slides the view down in the FIG. 5 (the direction of the finger operation is from the bottom to the top), the detailed information is changed and as shown in FIG. 7. FIG. 8 corresponds to FIG. 7, is a schematic diagram (2) of a comprehensive detailed information view 32 displayed on the screen 16 according to an embodiment of the disclosure, and the detailed information of the illustration are "instant times-and-sales" and "level-II quotation".

Figure 9:
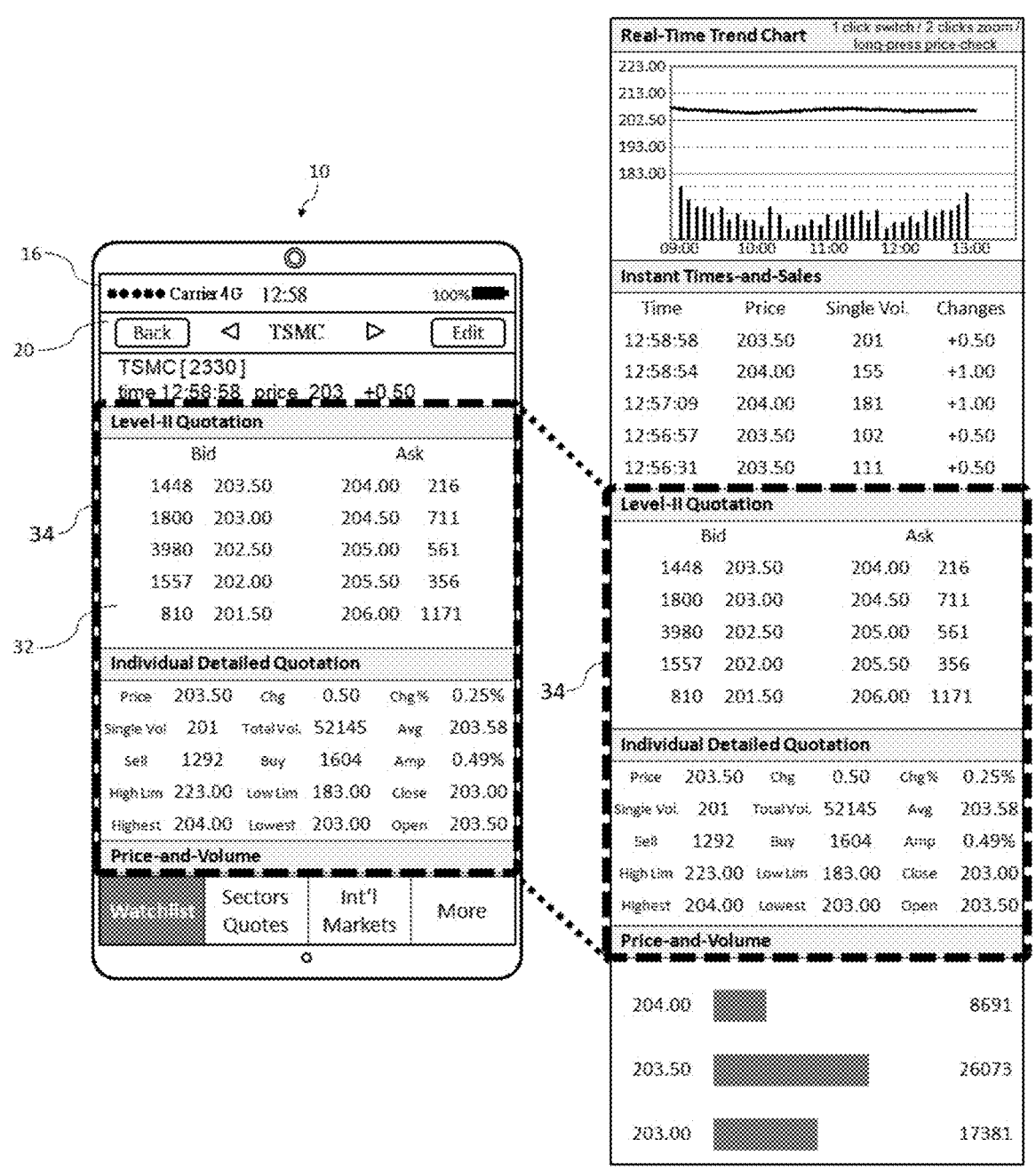
FIG. 9 is a schematic diagram (3) of a comprehensive detailed information view and the screen according to an embodiment of the disclosure.
Figure 10:
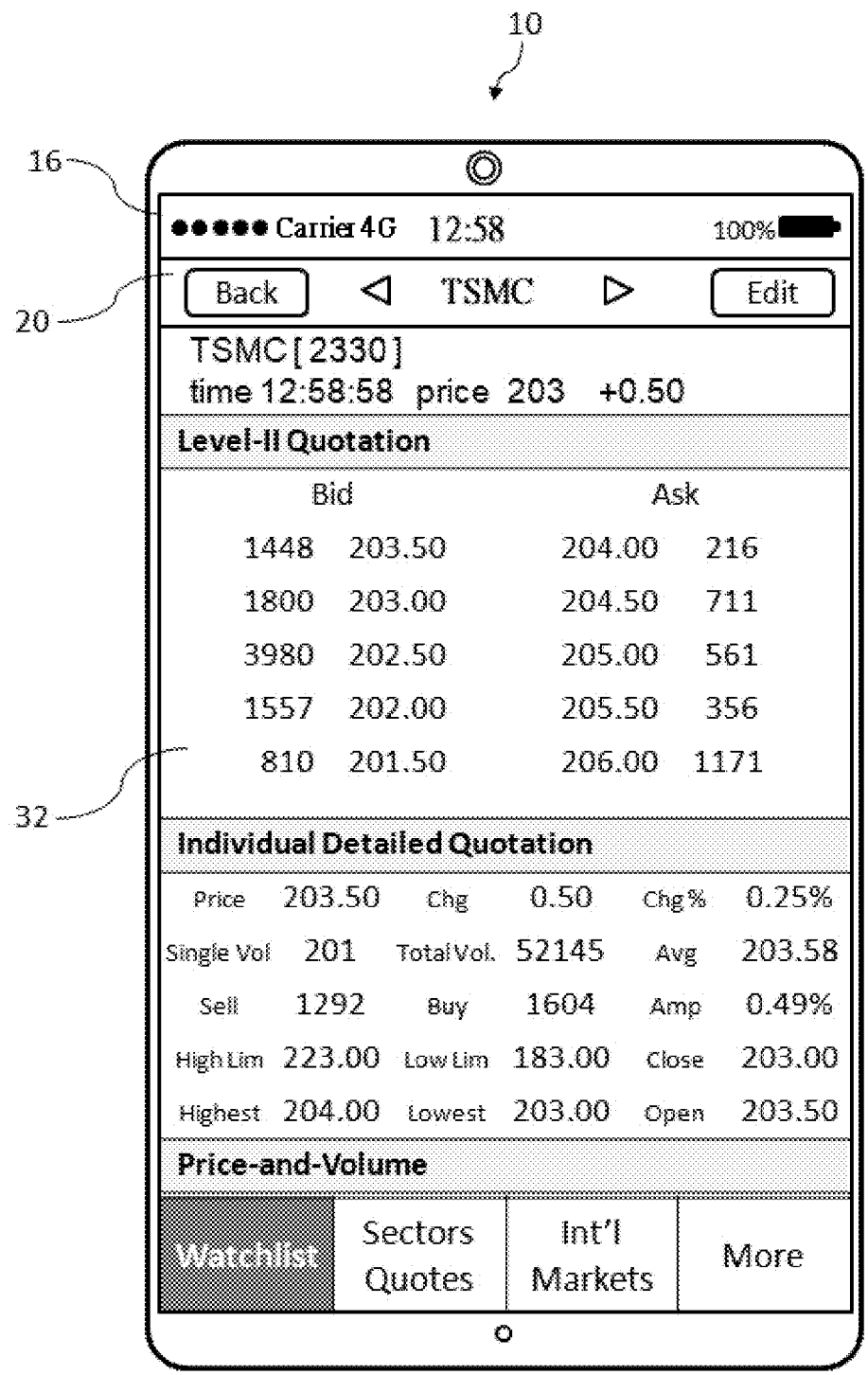
FIG. 10 is a schematic diagram (3) of a comprehensive detailed information view displayed on the screen according to an embodiment of the disclosure.

Please also refer to FIG. 9 and FIG. 10. FIG. 9 is a schematic diagram (3) of a comprehensive detailed information view 32 and a screen 16 according to an embodiment of the disclosure, and when the user slides the view down in FIG. 7 (the direction of the operation of the finger is from the bottom to the top), the detailed information is changed and as shown in FIG. 9. FIG. 10 corresponds to FIG. 9, is a schematic diagram (3) of a comprehensive detailed information view 32 displayed on the screen 16 according to an embodiment of the disclosure, and the detailed information of the illustration are "level-II quotation" and "individual detailed quotation".

Figure 11:
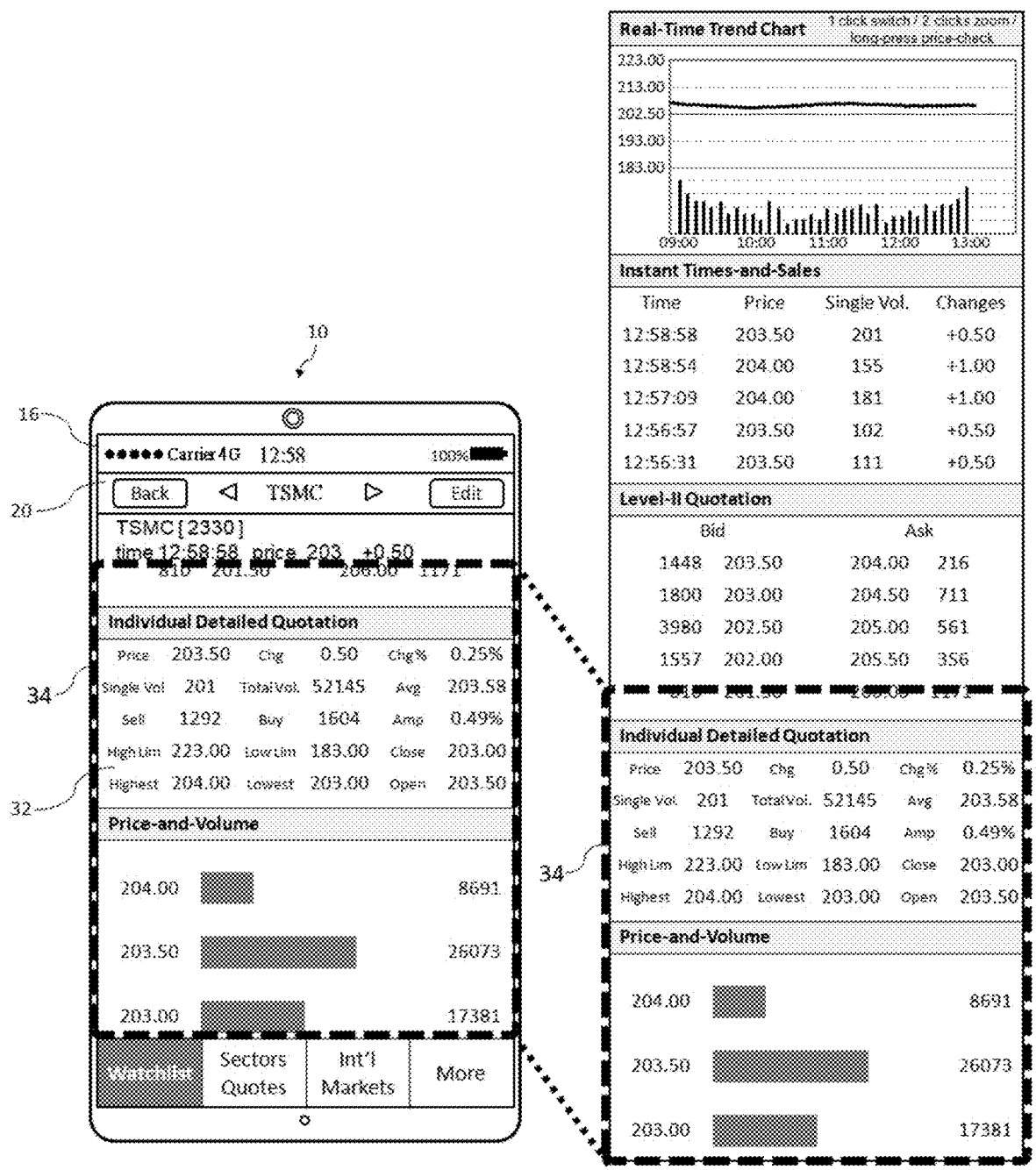
FIG. 11 is a schematic diagram (4) of a comprehensive detailed information view and the screen according to an embodiment of the disclosure.
Figure 12:
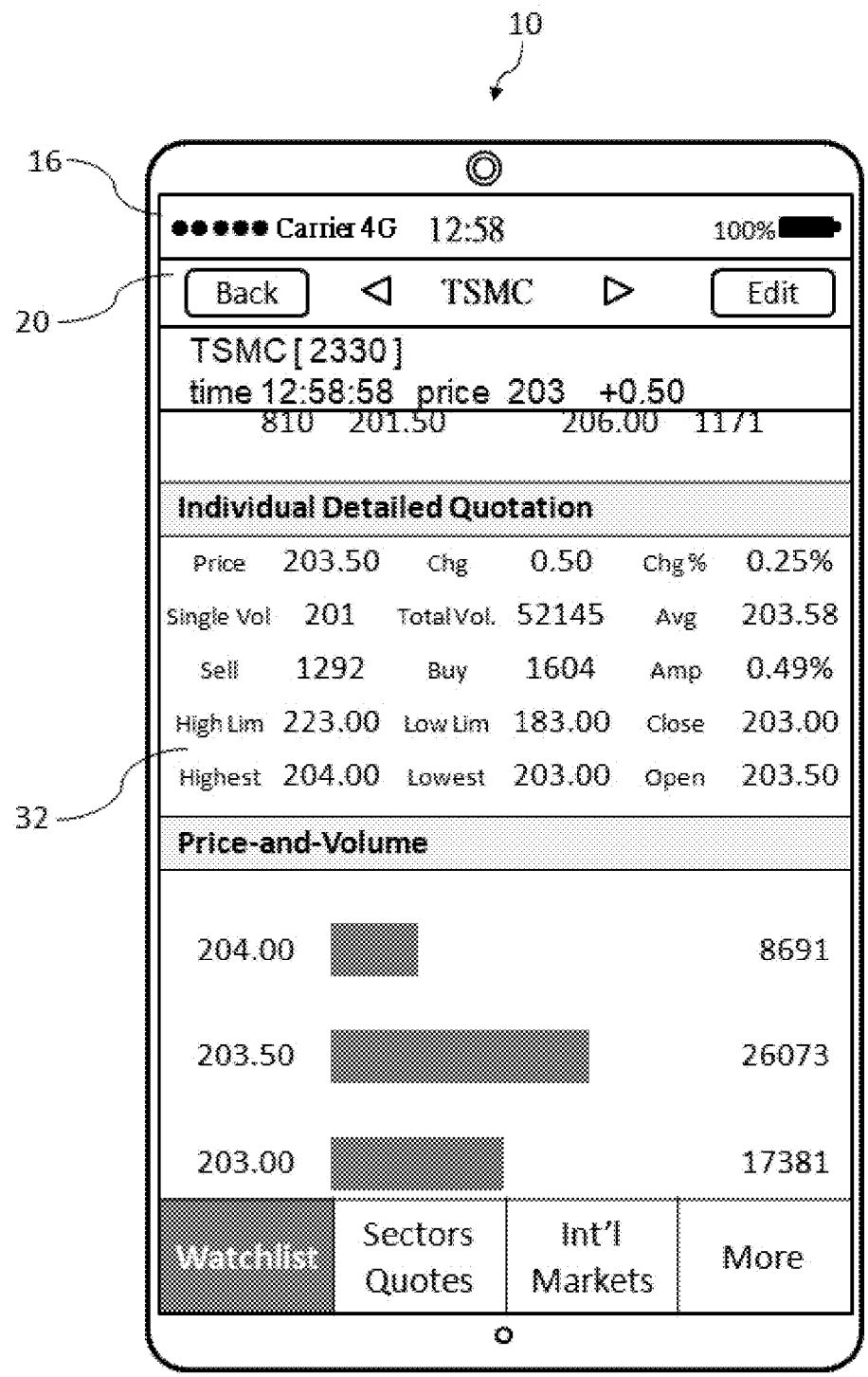
FIG. 12 is a schematic diagram (4) of a comprehensive detailed information view displayed on the screen according to an embodiment of the disclosure.

Please also refer to FIG. 11 and FIG. 12. FIG. 11 is a schematic diagram (4) of the comprehensive detailed information view 32 and the screen 16 according to an embodiment of the disclosure. When the user slides the view down in the FIG. 9 (the direction of the finger operation is from the bottom to the top), the detailed information is changed and as shown in FIG. 11. FIG. 12 corresponds to FIG. 11, is a schematic diagram (4) of a comprehensive detailed information view 32 displayed on the screen 16 according to an embodiment of the disclosure, and the detailed information of the illustration are "individual detailed quotation" and "price-and-volume statistics".

The user can switch among the different financial instruments directly by the horizontal sliding instructions in the comprehensive detailed information view 32 as well as to display different detailed information by the vertical sliding instruction. There's no need to return to the watchlist view 30 and then click on another financial instrument, such as the operation in the prior art. Take an example of the financial instruments in FIG. 3, the order is: "TWSE (Taiwan Index)", "TSMC", "UMC", "Foxconn" and "CHT (Chunghwa Telecom)". Assuming that the user views the "level-II quotation" and the "individual detailed quotation" of TSMC (as shown in FIG. 10) in the beginning, and then the user applies a horizontal sliding instruction in the comprehensive detailed information view 32 to change the view to the right and switch to "UMC" (not depicted), and the displaying position 34 is the same as the "level-II quotation" and the "individual detailed quotation" (not depicted). When the user swipes the view to the left (the direction of the finger operation is from left to right), the "TWSE" of the comprehensive detailed information view 32 (not depicted) is switched, and the displaying position 34 is still the same as the "level-II quotation" and the "individual detailed quotation" (not depicted). Due to "TWSE" is an index, rather than the general stocks, so no "level-II quotation" detailed information is shown. When the displaying position 34 of the "TWSE" of the comprehensive detailed information view 32 switches to the "level-II quotation", the comprehensive detailed information module 26 retains the position of "level-II quotation" in the comprehensive detailed information view 32 (only reserve the original "level-II quotation" occupancy height, without any quotation information) but shows a message "This instrument does not support this feature" (not depicted). This is another technical feature of the invention. "The same room size is still reserved for the detailed information even when it is not applicable", with the aim of fixing the same displaying position 34 when switching among different instruments.

The disclosure can display the same detailed information on the screen 16 when switching among the different financial instruments so that the user can quickly compare the same detailed information of the different instruments. The method is that the comprehensive detailed information module 26 stores the "displaying position 34 after the previous vertical sliding instruction is executed" in the memory 14. In fact, the "displaying position 34 of the previous vertical slide" is the "Y-axis coordinate of the comprehensive detailed information view 32 after the previous vertical sliding instruction is executed". The following Table 2 is based on the Java program language as an example of the fragment code, which is an embodiment of the disclosure, with "onScrollChanged" obtained by the "Callback Function" of the disclosure to obtain the "Y-axis coordinate of the comprehensive detailed information view 32 after the previous vertical sliding instruction is executed".

TABLE 2

```
private ScrollViewListener scrollViewListener = new
ScrollViewListener( ) {
    @Override
    public void onScrollChanged(StockDetailScrollView scrollView,
int x, int y, int oldx, int oldy) {
        if(y != scrollView.scrollY) {
            scrollView.scrollY = y;
            AppInfo.info.putInt(AppInfoKey.SCROLL_VALUE,
y);
            BaseFragment page = (BaseFragment)
getParentFragment( );
            if (page != null) {
                page.onActivityResult(100, scrollView.scrollY,
null);
            }
        }
    }
};
```

The comprehensive detailed information module 26 stores only the Y-axis coordinate of the comprehensive detailed information view 32 in the memory 14. Thus, whenever there is a new vertical sliding instruction, the old Y-axis coordinate is overwritten by the new Y-axis coordinate and the new Y-axis coordinate (equivalent to the displaying position 34) is stored in the memory 14. When the comprehensive detailed information module 26 receives the horizontal sliding instruction (for switching among the different financial instruments), the Y-axis coordinate in the memory 14 is loaded for directly specifying the Y axis coordinate (displaying position 34) of the comprehensive detailed information view 32 of another financial instrument 32 when it is produced. Table 3 is based on the Java program language as an example of the fragment code, which is an embodiment of the disclosure, to specify the Y-axis coordinate of the comprehensive detailed information view 32.

TABLE 3

```
scrollView.scrollY =
AppInfo.info.getInt(AppInfoKey.SCROLL_VALUE, 0);
scrollView.scrollTo(0, scrollView.scrollY);
```

The above-mentioned method of storing and specifying the Y-axis coordinate (displaying position 34), also explains why the above-mentioned comprehensive detailed information view 32 of the disclosure prioritizes to arrange the fixed-height detailed information above the unfixed-height detailed information, since the fixed-height detailed information does not change its height on the screen 16 when changing to the different financial instruments. Therefore, the disclosure arranges the unfixed-height detailed information below the fixed-height detailed information, in the bottom of the comprehensive detailed information view 32 to prevent the occurrence of errors (i.e., a different detailed information displayed after switching the instruments).

Figure 13:
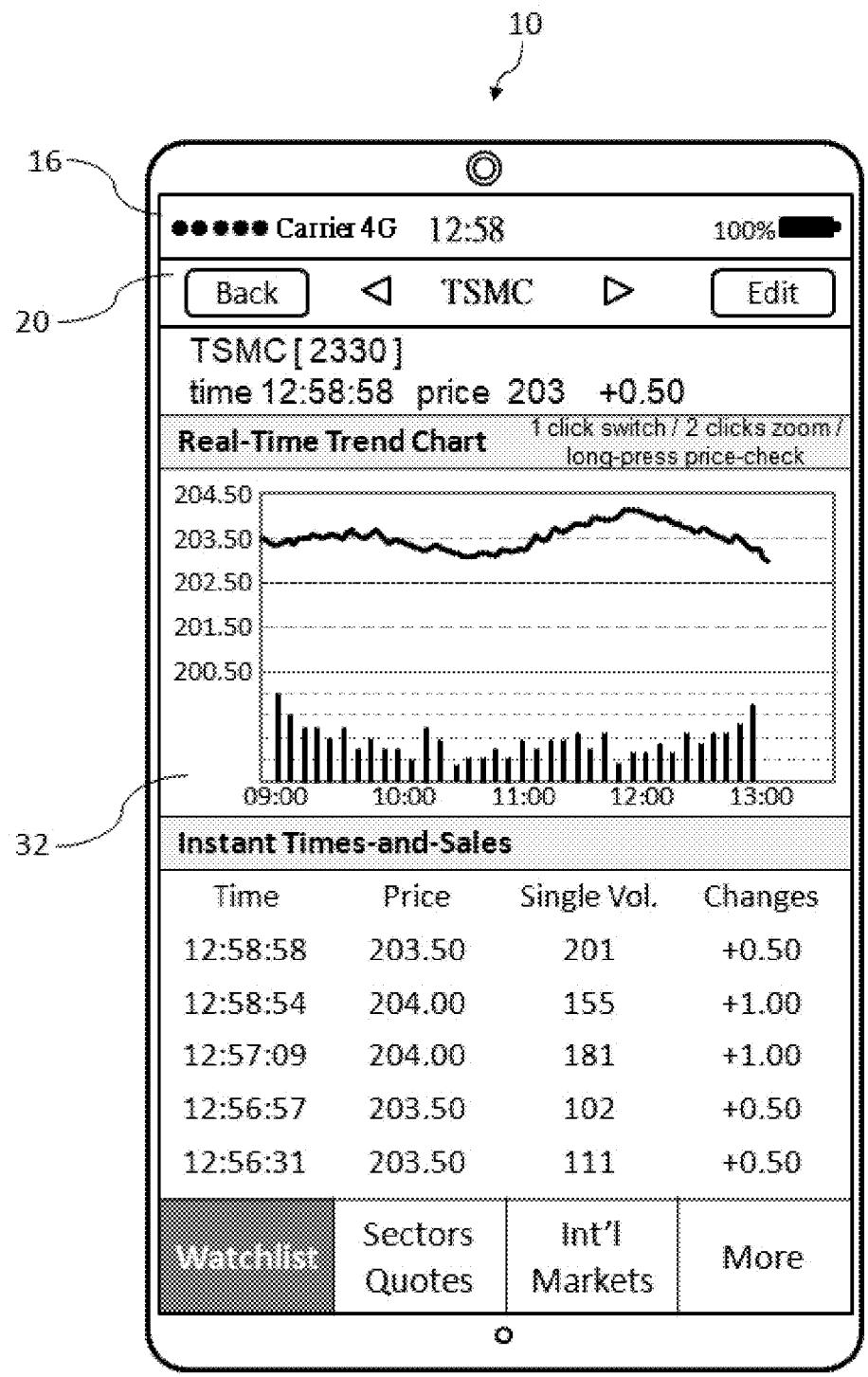
FIG. 13 is a schematic diagram of a Y-axis scale switching instruction changing the scale of the real-time trend chart according to an embodiment of the disclosure.

In the embodiment of the disclosure, the comprehensive detailed information module 26, in addition to receiving the vertical sliding instruction and the horizontal sliding instruction applied to the comprehensive detailed information view 32, may receive the Y-axis scale switching instruction, Y axis zooming instruction and price-check instruction of real-time trend chart of the comprehensive detailed information view 32. The Y-axis scale switching instruction is used to change the price scale of the Y-axis of real-time trend chart. Real-time trend chart of FIG. 6 is an example to illustrate the Y-axis maximum price marked "222.50" for "TSMC" is the daily high limit price, and the Y-axis lowest price marked "182.50" for "TSMC" is the daily low limit price. However, in general, it's not very often to see the daily high limit price nor the daily low limit price of financial instruments in the daily life. When the Y-axis price scale includes both the daily high limit and the daily low limit, the price line (trend line) is less likely to see its changes due to the larger scale. When the user applies the Y-axis scale switching instruction to the real-time chart, the comprehensive detailed information module 26 shrinks the Y-axis price scale and repaints the price line according to the new price scale, as shown in FIG. 13, thus the price line is easier to determine its changes. If the user wants to change back to the original Y-axis price scale, the user only needs to apply the Y-axis scale switching instructions again. In one embodiment, the Y-axis scale switching instruction is a single click, and the user clicks the real-time trend chart to generate a Y-axis scale switching instruction. As shown in FIG. 13, "1 Click switch" prompts the user. In another embodiment, the Y-axis scale switching instruction is generated from a "switching button" (not depicted) on the screen 16 clicked by the user, and the user clicks the "switching button" next to the real-time trend chart to produce a Y-axis scale switching instruction.

Figure 14:
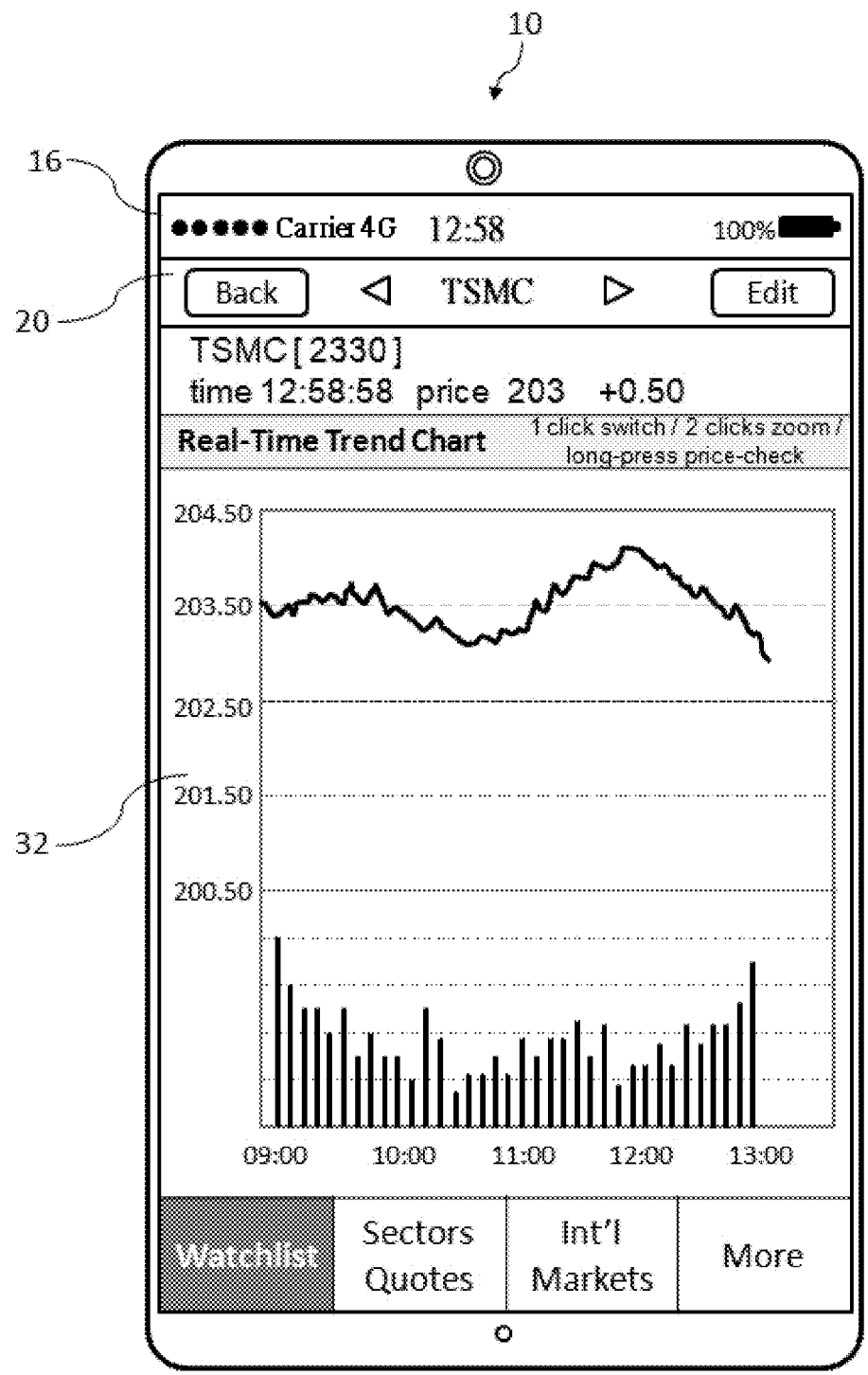
FIG. 14 is a schematic diagram of a Y-axis zooming instruction magnifying the real-time trend chart according to an embodiment of the disclosure.

If the user wants to enlarge (zoom in) the height of the trend chart, only need to apply the Y-axis zooming instruction to the real-time trend chart. The comprehensive detailed information module 26 receives the Y-axis zooming instruction and then doubles the "double-magnified Y-axis" (hereinafter referred to as "double Zoom in"), and only one detailed information is displayed on the screen 16. And the enlarged result is shown in FIG. 14. Applying the Y-axis zooming instruction on the doubled magnification of the real-time trend again can change back to the original height. In one embodiment, the Y-axis zooming instruction is a double click, and the user clicks twice on the real-time trend chart to generate a Y-axis zooming instruction, as shown in FIG. 13. A "2 clicks zoom" is indicated above the real-time trend chart to prompt the user. In another embodiment, the Y-axis zooming instruction is generated by the "zoom button" (not depicted) on the screen 16 clicked by the user, and the user clicks the "zoom button" next to the real-time trend chart to produce a Y-axis zooming instruction.

Figure 15:
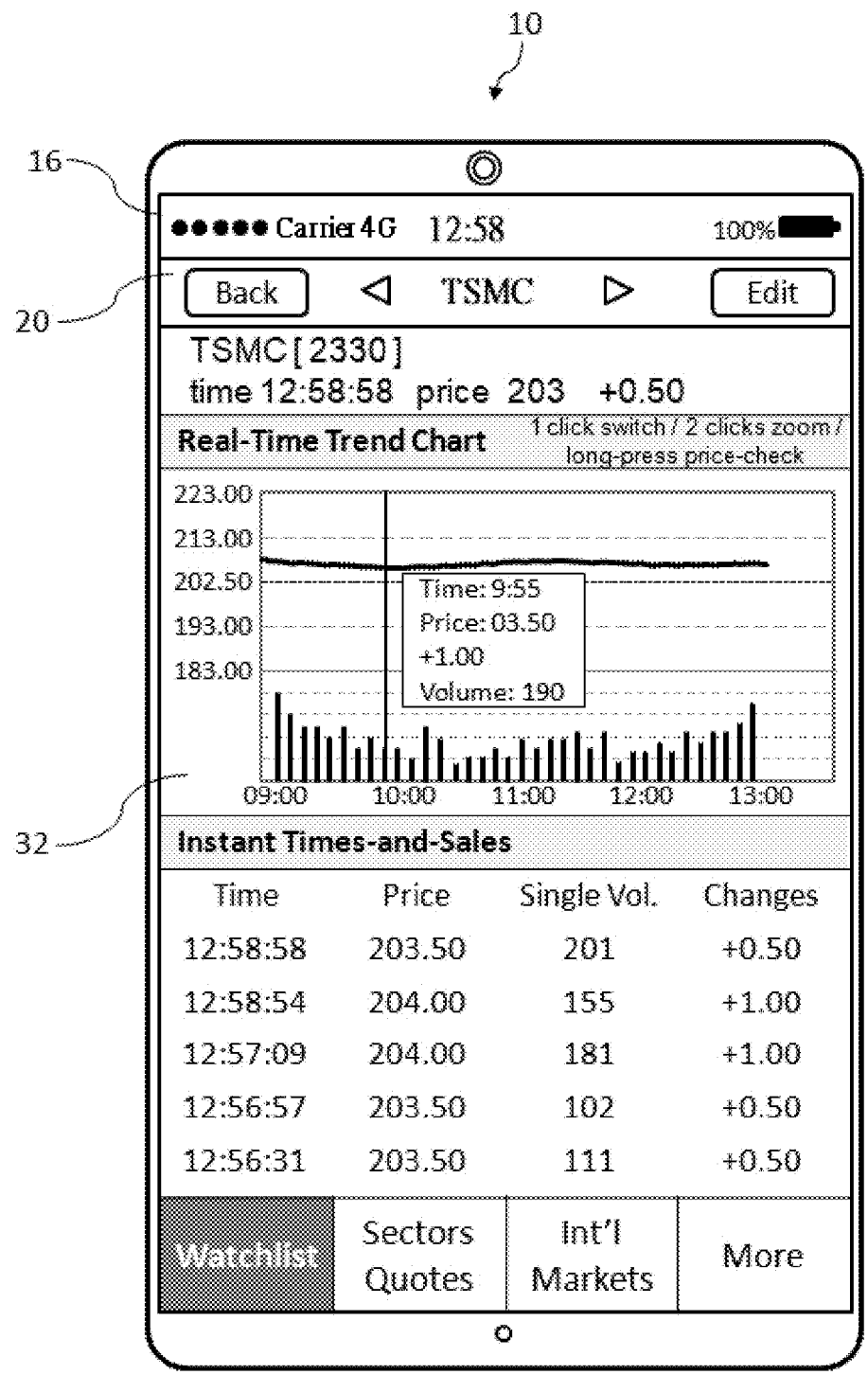
FIG. 15 is a schematic diagram of a price-check instruction showing a price-check tool in a real-time trend chart according to an embodiment of the disclosure.

If the user wants to check the detailed information of the price line at any time, user can apply "price-check instruction" to check the price and check the information of price-check. Moving the position of the price-check tool can update the price information of the corresponding checkpoint position, as shown in FIG. 15. In one embodiment, the price-check instruction is an instruction with long press and hold, and the user long presses the real-time trend chart to generate the price-check instruction, as shown in FIG. 15. There is a "long press price-check" above the real-time trend chart to prompts the user. In one embodiment, the price-check instruction is generated by the "price-check button" (not depicted) on the screen 16 clicked by the user, and the user clicks the "price-check button" next to the real-time trend chart to produce the price-check instruction.

The disclosure allows the user to present the double magnification of the height of the real-time trend chart on the screen 16 with the Y-axis zooming instruction as described above. In addition, the disclosure can configure the height of the real-time trend chart of the client side through the parameters transmitted by the quotation server. For example, change the original "standard height" of the real-time trend chart (as shown in FIG. 6) to "double magnification" (as shown in FIG. 14) by the parameters and vice versa. The following Table 4 is an example of the disclosure, illustrating the comprehensive detailed information module 26 controls the height of the real-time trend chart with parameters, and the Table 4 is a fragment code that takes the Java programming language as an example.

TABLE 4

```
public void onCreate(Bundle savedInstanceState) {
    super.onCreate(savedInstanceState);
    //**loading the user's configuration
    int temp = sharedPreferences.getInt("RTTCHART_TYPE",-1);
    //** loading the parameters if there's no user's configuration
    if(temp<0){
        temp =
Integer.parseInt(configProperties.getProperty("FNC_RTTCHART_TYP
E","0"));
    }
    if(temp == 0){
        diagramType =RTTChartType.Type_Half;
    }else{
        diagramType =RTTChartType.Type_All;
    }
}
    private int setHeight(String functionCode) {
    int height=0;
    if(functionCode.equals("RTTChart")){
        if(diagramType == RTTChartType.Type_Half){
            height = (int) (screenHeight*0.34f);
        }else{
            height = (int) (screenHeight*0.34f) +
(int)((screenHeight*0.34f/2) + height2);
        }
    }
}
```

The rules in Table 4 are "Load the user's configurations first, and if the user does not configure the height of the real-time trend chart, control the height by the downloaded parameter" "RTTChartType.Type_Half" represents "standard height", "RTTChartType.Type_All" represents "double enlargement" with the parameter "FNC_RTTCHART_TYPE". And the height of the real-time trend chart is "standard height" when the value of the parameter is "0" and the height of the real-time trend chart is the "double magnification" height when the value is not "0".

Figure 16:
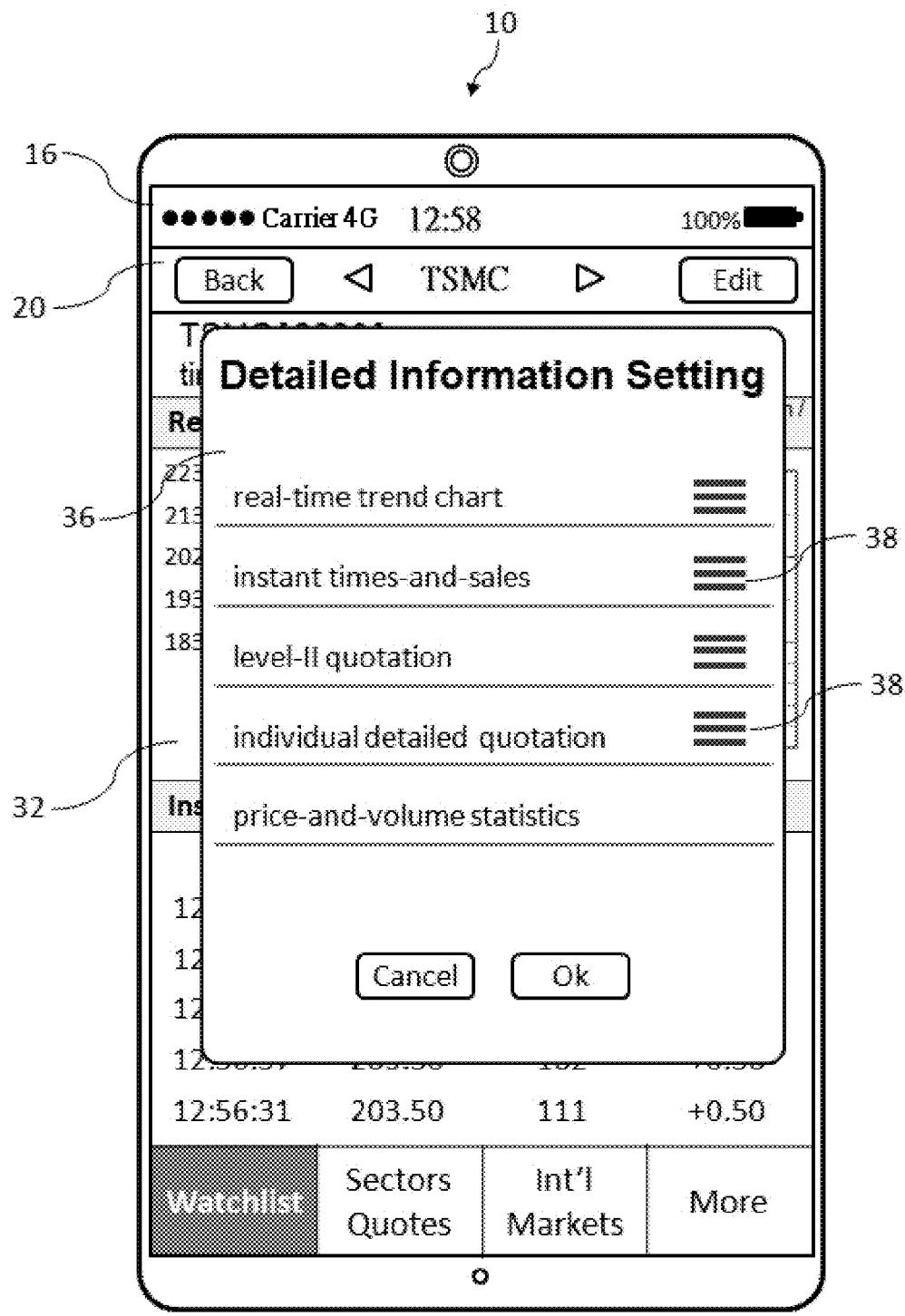
FIG. 16 is a schematic diagram of a detailed information setting view displayed on the screen according to an embodiment of the disclosure.

Referring to FIG. 16, it shows a detailed information setting view 36 according to an embodiment of the disclosure. The detailed information setting view 36 is generated by the system setting module 28. When the user enters the system settings view (not depicted) with the menu (not depicted), then select "configure detailed information order" to pop up the detailed information setting view 36.

The illustration indicates that each of the fixed-height detailed information of the disclosure has a corresponding detailed information representative icon 38, which allows the user to adjust the permutation order by operating the detailed information representative icon 38. (In this embodiment, the "price-and-volume statistics") is always placed at the bottom of the comprehensive detailed information view 32 in the disclosure, so that the corresponding detailed information representative icon 38 is not configured. That is, the user can not adjust the order of unfixed-height detailed information. The configuration is stored as a default. That is, the application program 20 will display the detailed information in the comprehensive detailed information view 32 in this order.

The above-described embodiments and schemes are used to illustrate the technical features of the disclosure and are not used to limit the contents, types and quantities of the detailed information. Besides the real-time trend chart, the instant times-and-sales, the level-II quotation, the individual detailed quotation and the price-and-volume statistics mentioned above, it may also be combined with other different detailed information in other different embodiments, such as: technical analysis, times-and-sales, stocks news, basic information, financial diagnosis, moving average trend, alert notification . . . and many more. The comprehensive detailed information view 32 of the combination of different detailed information still comply with the rules of the invention, that is, the fixed-height detailed information of the disclosure is prioritized to arrange above the unfixed-height detailed information.

Figure 17:
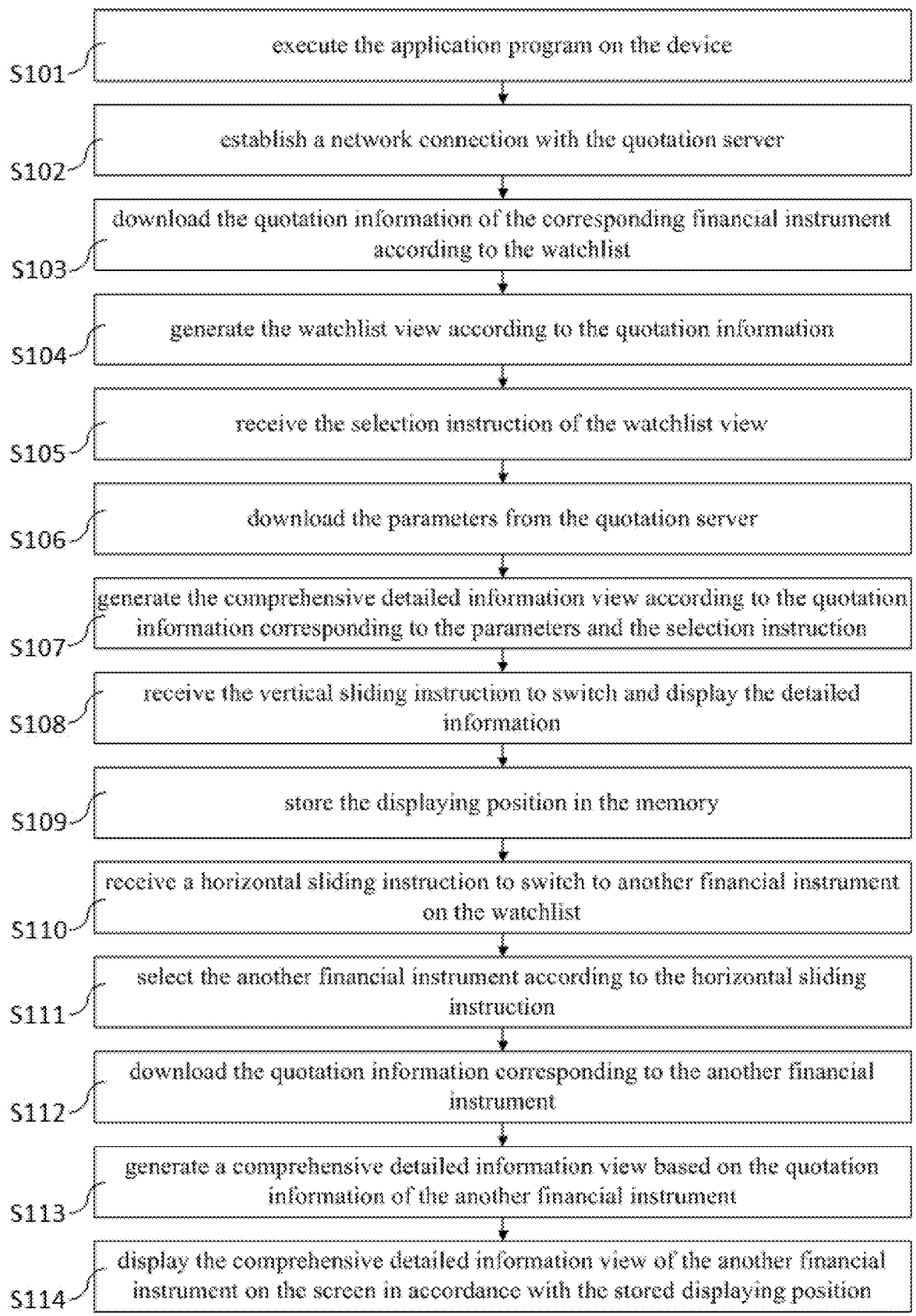
FIG. 17 is a flowchart showing the operation according to an embodiment of the disclosure.

Referring to FIG. 17, a flowchart of an operation according to an embodiment of the disclosure is performed by a user using a mobile device (e.g., a smartphone/tablet) to select a financial instrument in the watchlist view 30 to view its comprehensive detailed information view, and then switch to another financial instrument. Please refer to FIG. 1, FIG. 2, FIG. 3, FIG. 4, FIG. 6 and FIG. 8, the flowchart comprises:

Step S101: execute the application program 20 of the disclosure on the device 10. The user executes the application program 20 (stock quoting software) of the disclosure on the device 10 of vertical comprehensive detailed information, such as a mobile device (smartphone/tablet computer, etc.).

Step S102: establish a network connection with the quotation server. When the communication module 18 establishes an Internet connection, the data transferring module 22 establishes a network connection with the remote quotation server. In some embodiments, when the data transferring module 22 establishes a network connection with the remote quotation server, the user needs to enter an account/password to login.

Step S103: download the quotation information of the corresponding financial instrument according to the watchlist. After the data transferring module 22 establishes a connection with the remote quotation server, the watchlist module 24 downloads the quotation information of the financial instruments in the corresponding list according to the watchlist and stores it in the memory 14. The method of triggering to download the quotation information of the financial instrument corresponding to the watchlist is that the user switches to the watchlist view 30.

Step S104: generate the watchlist view 30 according to the quotation information. After the quotation information is downloaded, the watchlist module 24 generates the watchlist view 30 based on the downloaded quotation information, as shown in FIG. 3.

Step S105: receive the selection instruction of the watchlist view 30. When the watchlist view 30 is generated, it is assumed that the user wants to view the comprehensive detailed information view 32 of TSMC and click "TSMC" to generate a selection instruction. The watchlist module 24 receives the selection instruction in the watchlist view 30, the watchlist module 24 triggers the comprehensive detailed information module 26 and forwards the selection instruction corresponding to TSMC to the comprehensive detailed information module 26.

Step S106: download the parameters from the quotation server. The parameters of this embodiment are used to configure the order of the detailed information and to configure the height of the real-time trend chart. In this case, assuming that the parameters of the order are "{"RTTChart", "TimesNSales", "LevelII", "IndividualDetailedQuote", "PriceNVolume"}", and the value of the height of the real-time trend chart parameter "FNC_RTTCHART_TYPE" is "0" ("standard height").

Step S107: generate the comprehensive detailed information view 32 according to the quotation information corresponding to the parameters and the selection instruction. The comprehensive detailed information module 26 generates the comprehensive detailed information view 32 (as shown in FIG. 4) after receiving the selection instruction of "TSMC", that is, based on the parameters downloaded in the previous step and the quotation information corresponding to "TSMC". Where the parameters are used to control the order of the detailed information and the height of the real-time trend chart, and finally the comprehensive details view 32 is displayed on the screen 16 as shown in FIG. 6.

Step S108: receive the vertical sliding instruction to switch and display the detailed information. Assuming that the user wants to view the "level-II quotation" of TSMC, the comprehensive detailed information view 32 should be operated by a vertical slide (vertical sliding instruction). The comprehensive detailed information module 26 receives the vertical sliding instruction of the comprehensive detailed information view 32, and switch to "level-II quotation" and display it on the screen 16, as shown in FIG. 8.

Step S109: store the displaying position 34 in the memory 14. Each time the vertical sliding instruction is executed, the comprehensive detailed information module 26 stores the latest displaying position 34 in the memory 14 and the displaying position 34 is obtained by calculating the Y-axis coordinate of the comprehensive detailed information view 32 with the callback function.

Step S110: receive a horizontal sliding instruction to switch to another financial instrument on the watchlist. Assuming that the user wants to view the "level-II quotation" of another financial instrument "UMC" on the watchlist while viewing the "level-II quotation" of "TSMC", the user slides horizontally in comprehensive detailed information view 32 (generate a horizontal sliding instruction). At this time, the comprehensive detailed information module 26 receives the horizontal sliding instruction applied to the comprehensive detailed information view 32.

Step S111: select the another financial instrument according to the horizontal sliding instruction. After receiving the horizontal sliding instruction applied to the comprehensive detailed information view 32, the comprehensive detailed information module 26 receives the another financial instrument on the watchlist according to the sliding direction of the horizontal sliding instruction. Assuming that the user slides the view to the right with the horizontal sliding instruction (the operating direction of the finger is from right to left), the "another financial instrument" is the "UMC" in the order of the watchlist.

Step S112: download the quotation information for the another financial instrument. The comprehensive detailed information module 26 drives the data transferring module 22 to download the quotation information of the another financial instrument ("UMC"), which is downloaded and stored in the memory 14.

Step S113: generate a comprehensive detailed information view 32 based on the quotation information of the another financial instrument. After downloading the quotation information for the another financial instrument ("UMC"), the comprehensive detailed information module 26 generates a comprehensive detailed information view 32 of the UMC based on the quotation information of the another financial instrument (UMC) (not depicted).

Step S114: display the comprehensive detailed information view 32 of the another financial instrument on the screen 16 in accordance with the stored displaying position 34. The comprehensive detailed information view 32 is displayed on the screen 16 in accordance with the displaying position 34 stored in the memory 14 after the comprehensive detailed information view 32 of the another financial instrument ("UMC") is generated. And the displaying position 34 is stored in Step S108, so that the displayed detailed information is the same as the step S108 (i.e., the "level-II quotation").

In other words, the steps S107 to S114 of the above-described operation flowchart allow the user to quickly switch among the financial instruments on the watchlist and facilitate the user to quickly compare the same detailed information of the two different financial instruments, which greatly simplifies the operating steps than the prior arts. It is not necessary to return to the watchlist view 30 again before switching to another financial instrument on the watchlist, and it is not necessary to slide vertically in order to switch to the same displaying position 34 as operating in the prior arts.

In various embodiments of the disclosure, program instructions executed by a computer can implement every block in the flowchart, a combination of the blocks in the flowchart, and the steps in every embodiment. The program instructions are provided to a processor so as to be executed by the processor to thereby produce resources required for a machine or coordinated operation of hardware and software; hence, the instructions are executed on the processor to thereby produce elements required for carrying out actions specified by the blocks in the flowchart or technical effects. Different combinations of program instructions also allow simultaneous execution of at least some operating steps specified in the blocks in the flowchart, whereas the technical solutions indicated by the first through fourth program instructions of an application may vary from embodiment to embodiment. Furthermore, it is also practicable that some of the steps are executed on one or more processors, for example, in the case of a servo computer system of multiple processors or in the case of coordinated operation of a microprocessor in a mobile communication device and a peripheral interface processor. Moreover, in the flowchart, at least one block or a combination of blocks may be performed along with the other block or the other combination of blocks simultaneously or performed in a sequence different from its specified counterpart, without departing from the spirit and scope of the disclosure.

Therefore, the blocks in the flowchart of the disclosure support a combination of elements required for performing specified actions or technical solutions, a combination of steps required for performing specified actions or technical solutions, and program instruction elements required for performing specified actions or technical solutions. What is also understandable is that the specified actions or technical solutions are effectuated by a combination of blocks in the flowchart as well as each block in the flowchart of the disclosure through the coordinated operation of a special-purpose hardware-style system or special-purpose hardware, and program instructions.

In conclusion, the disclosure proposes a technique for comprehensive detailed information, which solves the problem that the prior arts can not configure the comprehensive detailed information of the client side by utilizing the parameters transmitted from the server side to achieve the customized comprehensive detailed information. The invention does not need to go through the process of updating software version to provide customized comprehensive detailed information, which saves a lot of time for financial information vendors. In addition, the user can easily switch the detailed information of the different financial instruments quickly.

The disclosure can meet the needs of the financial information vendors and the users by making up the details of the comprehensive detailed information. The technical solution of the present invention is disclosed above by preferred embodiments. However, the preferred embodiments are not restrictive of the present invention. Slight changes and modifications can be made by persons skilled in the art to the aforesaid embodiments without departing from the spirit of the present invention and shall still fall within the scope of the present invention. Accordingly, the legal protection for the present invention should be defined by the appended claims.

What is claimed is:

1. A method of a vertical comprehensive detailed information, applicable to a mobile device, the mobile device comprising a communication module, a memory and a screen, wherein the memory stores a watchlist and the watchlist contains a plurality of financial instruments pre-selected by a user, the method comprising the steps of:

establishing a network connection with a quotation server through the communication module;

downloading quotation information of the corresponding financial instruments according to the watchlist from the quotation server;

generating a watchlist view based on the quotation information, the watchlist view including names of the plurality of financial instruments in the watchlist and current price information for each of the plurality of financial instruments;

receiving a selection instruction for selecting a first financial instrument from the watchlist view;

generating a comprehensive detailed information view of the first financial instrument based on the quotation information corresponding to the first financial instrument, wherein the comprehensive detailed information view of the first financial instrument integrates a plurality of detailed information of the first financial instrument in a vertical direction;

displaying a first one of the plurality of detailed information of the comprehensive detailed information view of the first financial instrument on the screen;

receiving a vertical sliding instruction acting on the comprehensive detail information view of the first financial instrument to switch the first one of the plurality of detailed information and display a second one of the plurality of detailed information of the first financial instrument on the screen;

storing a displaying position of the comprehensive detailed information view of the first financial instrument in the memory after executing the vertical sliding instruction thereby a position of the second one of the plurality of detailed information is stored;

receiving a horizontal sliding instruction acting on the comprehensive detailed information view to switch to a second financial instrument on the watchlist;

selecting the second financial instrument according to the horizontal sliding instruction;

downloading the quotation information corresponding to the second financial instrument;

generating the comprehensive detailed information view of the second financial instrument based on the quotation information corresponding to the second financial instrument, wherein the comprehensive detailed information view of the second financial instrument integrates the plurality of detailed information of the second financial instrument, the plurality of detailed information of the second financial instrument corresponding to the plurality of detailed information of the first financial instrument; and displaying the second one of the plurality of detailed information of the comprehensive detailed information view of the second financial instrument on the screen at a displaying position corresponding to the displaying position of the second one of the plurality of detailed information of the comprehensive detailed information view of the first financial instrument stored in the memory.

2. The method of a vertical comprehensive detailed information as claimed in claim 1, wherein one of the detailed information is a real-time trend chart, the method further comprises the steps of: receiving a Y-axis scale switching instruction of the real-time trend chart to change a displaying scale of a vertical axis, receiving a Y-axis zooming instruction of the real-time trend chart to double magnify or restore an original height of the real-time trend chart, and receiving a price-check instruction of the real-time trend chart to produce a price-check tool on the real-time trend chart.

3. The method of a vertical comprehensive detailed information as claimed in claim 2, wherein the method further comprises the step of configuring the height of the real-time trend chart to a standard height or a double magnification height based on a height parameter downloaded from the quotation server.

4. The method of a vertical comprehensive detailed information as claimed in claim 1, wherein the detailed information are divided into two categories: a fixed-height detailed information and an unfixed-height detailed information, and the unfixed-height detailed information are arranged below the fixed-height detailed information.

5. The method of a vertical comprehensive detailed information as claimed in claim 1, wherein the method further comprises the step of generating a detailed information setting view and receiving a drag-and-drop instruction applied to the detailed information setting view to change the order of the information.

6. The method of a vertical comprehensive detailed information as claimed in claim 1, wherein the method further comprises the step of receiving a parameter from the quotation server and generating the comprehensive detailed information view based on the parameter and the quotation information corresponding to the selection instruction, wherein the parameter is used to configure the order of the detailed information.

7. The method of a vertical comprehensive detailed information as claimed in claim 1, wherein the current price information is current stock price information.

\* \* \* \* \*